(12) United States Patent
Furuya

(10) Patent No.: US 9,688,277 B2
(45) Date of Patent: Jun. 27, 2017

(54) CONTROL SYSTEM FOR VEHICLE

(71) Applicant: TOYOTA JIDOSHA KABUSHIKI KAISHA, Toyota-shi, Aichi-ken (JP)

(72) Inventor: Yoshihiro Furuya, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/987,887

(22) Filed: Jan. 5, 2016

(65) Prior Publication Data

US 2016/0194007 A1 Jul. 7, 2016

(30) Foreign Application Priority Data

Jan. 7, 2015 (JP) ................. 2015-001475

(51) Int. Cl.
*B60W 30/20* (2006.01)
*B60W 10/06* (2006.01)
(Continued)

(52) U.S. Cl.
CPC ...... *B60W 30/18054* (2013.01); *B60W 10/02* (2013.01); *B60W 10/06* (2013.01); *B60W 20/00* (2013.01); *B60W 20/40* (2013.01); *B60W 30/18* (2013.01); *B60W 30/20* (2013.01); *F02D 35/026* (2013.01); *F02D 41/065* (2013.01); *F02N 11/0814* (2013.01); *F02N 11/0825* (2013.01);
(Continued)

(58) Field of Classification Search
CPC F16D 30/20; F16D 2500/3069; B60W 10/20; B60W 30/18; B60W 10/06; B60W 2520/06; B60W 2550/10; B60W 2540/20; B60W 2030/206; B60W 2510/06; B60W 2560/06; B60W 2540/12; B60W 2710/0622; B60W 2710/06; B60W 20/40; B60W 2510/0208; B60W 2540/04; B60W 2540/14; F02D 35/026; F02D 41/065; F02N 11/0814; Y10T 477/669; Y10T 477/67
See application file for complete search history.

(56) References Cited

U.S. PATENT DOCUMENTS 4,809,660 A * 3/1989 Marsh ................... F02P 5/1455
123/406.65
2004/0242370 A1* 12/2004 Iwatsuki ........... F16H 61/66272
477/45
(Continued)

FOREIGN PATENT DOCUMENTS

JP 2000-313253 A 11/2000
JP 2001-020769 A 1/2001
(Continued)

*Primary Examiner* — Ramya Burgess
*Assistant Examiner* — Lillian Nguyen
(74) *Attorney, Agent, or Firm* — Andrews Kurth Kenyon LLP

(57) ABSTRACT

If a predicted compression-time in-cylinder temperature Tp having a positive correlation with the intensity of predicted pre-ignition is equal to or higher than a pre-ignition threshold value Tig when a request for automatic start is made, a forward/reverse switching mechanism is placed in a released state, and an engine is automatically started. If the predicted compression-time in-cylinder temperature Tp is lower than the pre-ignition threshold value Tig, the forward/reverse switching mechanism is placed in an engaged state, and the engine is automatically started.

11 Claims, 11 Drawing Sheets

(51) Int. Cl.
*B60W 30/18* (2012.01)
*B60W 10/02* (2006.01)
*B60W 20/00* (2016.01)
*F02D 41/06* (2006.01)
*F02N 11/08* (2006.01)
*F02D 35/02* (2006.01)
*B60W 20/40* (2016.01)
*F02D 41/02* (2006.01)
*F02N 11/04* (2006.01)

(52) U.S. Cl.
CPC ... *B60W 2030/206* (2013.01); *B60W 2510/06* (2013.01); *B60W 2510/0676* (2013.01); *B60W 2520/04* (2013.01); *B60W 2520/06* (2013.01); *B60W 2540/10* (2013.01); *B60W 2540/12* (2013.01); *B60W 2540/20* (2013.01); *B60W 2550/10* (2013.01); *B60W 2560/06* (2013.01); *B60W 2710/021* (2013.01); *B60W 2710/06* (2013.01); *B60W 2710/0622* (2013.01); *F02D 41/022* (2013.01); *F02D 2200/021* (2013.01); *F02N 11/04* (2013.01); *F02N 2011/0896* (2013.01); *F02N 2200/0801* (2013.01); *F02N 2200/0802* (2013.01); *F02N 2200/101* (2013.01); *F02N 2200/12* (2013.01); *Y02T 10/48* (2013.01)

(56) References Cited

U.S. PATENT DOCUMENTS

| | | |
|---|---|---|
| 2011/0144893 A1 | 6/2011 | Rollinger et al. |
| 2011/0237394 A1 | 9/2011 | Hirai et al. |
| 2012/0067309 A1 | 3/2012 | Murai et al. |
| 2014/0257676 A1 | 9/2014 | Santoso et al. |

FOREIGN PATENT DOCUMENTS

| | | |
|---|---|---|
| JP | 2003-301765 A | 10/2003 |
| JP | 2004-142632 A | 5/2004 |
| JP | 2005-114173 A | 4/2005 |
| JP | 2008-185022 A | 8/2008 |
| JP | 2010-127178 A | 6/2010 |
| JP | 2011-208699 A | 10/2011 |
| JP | 2014-031727 A | 2/2014 |
| JP | 2014-151841 A | 8/2014 |
| WO | 2014/020404 A1 | 2/2014 |
| WO | 2014020404 A1 | 2/2014 |

\* cited by examiner

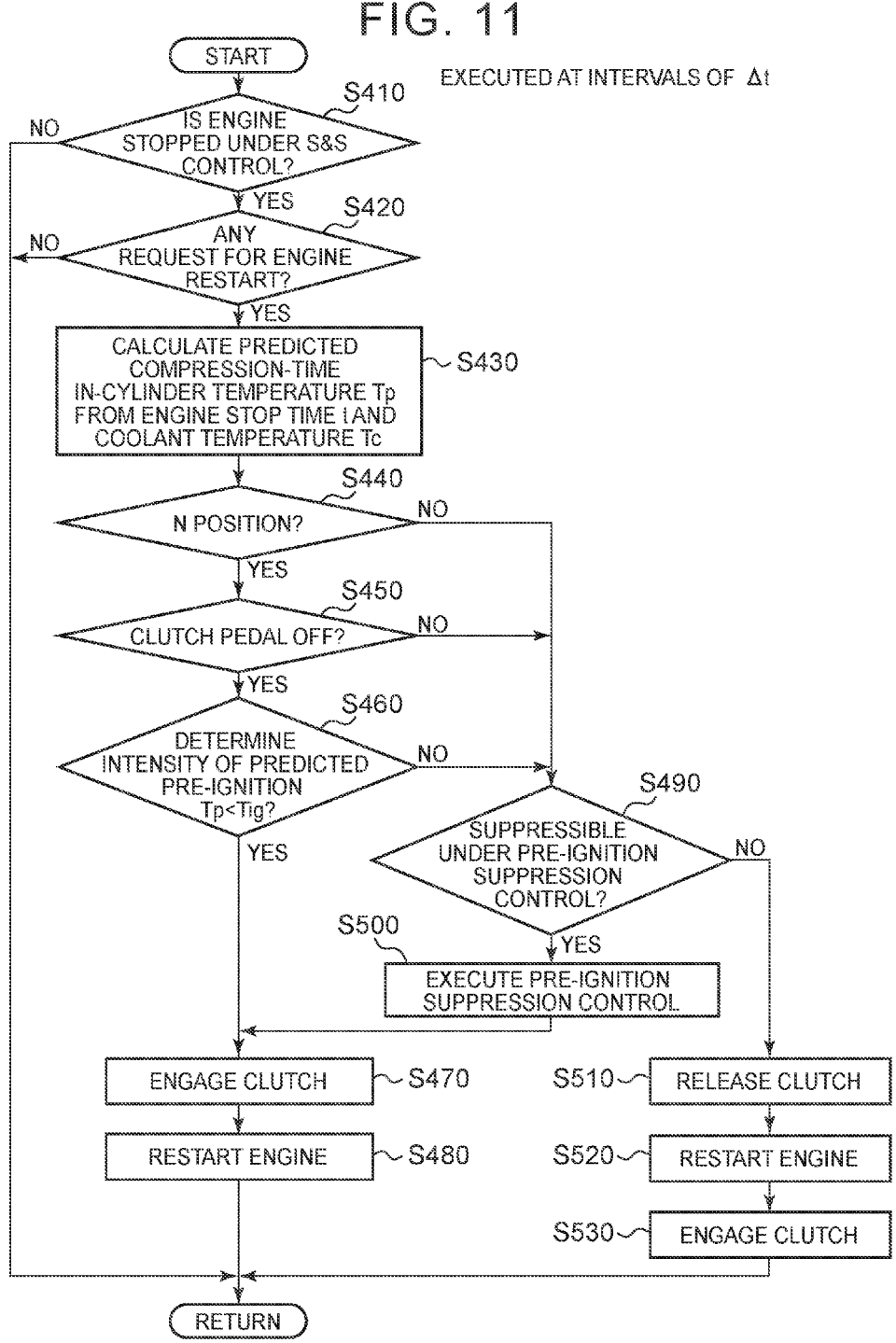

CONTROL SYSTEM FOR VEHICLE

INCORPORATION BY REFERENCE

The disclosure of Japanese Patent Application No. 2015-001475 filed on Jan. 7, 2015 including the specification, drawings and abstract is incorporated herein by reference in its entirety.

BACKGROUND OF THE INVENTION

1. Field of the Invention

Embodiments of the present invention relates to a control system for a vehicle having a function of automatically stopping and automatically starting an internal combustion engine during running, so as to save fuel or reduce exhaust emissions.

2. Description of Related Art

A control system for a vehicle, which performs automatic stop-and-restart control on an engine, has been proposed. The system automatically stops the engine under given stop conditions, when an automobile stops at an intersection, for example, and restarts the engine under given restart conditions, when the accelerator pedal is depressed, for example. Generally, the engine is automatically stopped when the vehicle is stopped. However, a vehicle in which the engine is automatically stopped when the vehicle speed is reduced to be equal to or lower than a predetermined value, even before the vehicle is stopped, has been proposed.

In a vehicle disclosed in Japanese Patent Application Publication No. 2004-142632 (JP 2004-142632 A), when a request for automatic start is made, the engine is automatically started while the clutch is placed in the engaged state. In a vehicle disclosed in Japanese Patent Application Publication No. 2001-020769 (JP 2001-020769 A) and Japanese Patent Application Publication No. 2011-208699 (JP 2011-208699 A), when a request for automatic start is made, the engine is automatically started while the clutch is placed in the released state, so that shock that occurs at the time of restart is not transmitted to drive wheels.

SUMMARY

When the engine is automatically started after automatically being stopped, with a short interval between the stop and the start, the temperature in each cylinder is relatively high. Therefore, the possibility of occurrence of pre-ignition (namely, self-ignition at a time earlier than the intended ignition timing, e.g., a time earlier than spark ignition caused by a spark plug) during the compression stroke is increased. If the pre-ignition occurs, larger vibrations are generated from the engine as compared with the case where no pre-ignition occurs. In the vehicle of JP 2004-142632 A, the engine is automatically started while the clutch is in the engaged state; therefore, when pre-ignition occurs, large drive power is transmitted from the engine to drive wheels via a power transmission mechanism, and stress may be placed on the driver, due to vibration generated in the vehicle in the starting direction.

On the other hand, in the vehicles of JP 2001-020769 A and JP 2011-208699 A, since the engine is automatically started while the clutch is placed in the released state, a time lag for transition of the clutch from the released state to the engaged state arises after the engine is started, and the delay in starting may place another type of stress on the driver.

Embodiments of the present invention reduce a delay in starting, while suppressing vibration of a vehicle caused by pre-ignition.

According to one embodiment of the invention, a control system for a vehicle is provided. The vehicle includes an internal combustion engine configured to perform automatic stop and automatic start, and a clutch configured to permit transmission of power from the internal combustion engine to wheels when the clutch is in an engaged state. The clutch is configured to interrupt transmission of power from the internal combustion engine to the wheels when the clutch is in a released state. The control system includes at least one electronic control unit configured to i) place the clutch in the released state and automatically start the internal combustion engine, when a request for automatic start is made, and an index value is equal to or larger than a first threshold value, the index value having a positive correlation with an intensity of predicted pre-ignition, and ii) place the clutch in the engaged state and automatically start the internal combustion engine, when a request for automatic start is made, and the index value is smaller than the first threshold value.

According to the above embodiment of the invention, when the index value having a positive correlation with the intensity of the predicted pre-ignition is equal to or larger than the first threshold value, the clutch is placed in the released state, and the internal combustion engine is automatically started. Accordingly, vibration generated in the vehicle in the starting direction when pre-ignition occurs can be suppressed. On the other hand, when the index value is smaller than the first threshold value, the clutch is placed in the engaged state, and the internal combustion engine is automatically started. Accordingly, it is possible to reduce a delay in starting due to a time lag for transition of the clutch from the released state to the engaged state.

The above-indicated index value may be a temperature in a cylinder of the internal combustion engine. In this case, the intended effect of embodiments of the invention can be achieved with a simple arrangement.

The electronic control unit may be configured to estimate the temperature in the cylinder, based on an elapsed time from the stopping of the internal combustion engine.

The electronic control unit may be configured to correct at least one of the index value and the first threshold value, based on at least one of a coolant temperature of the internal combustion engine, and properties of a fuel.

The electronic control unit may be configured to i) determine whether the index value can be controlled to be smaller than a second threshold value, through pre-ignition suppression control for suppressing the pre-ignition, ii) a) perform the pre-ignition suppression control and b) place the clutch in the engaged state and automatically start the internal combustion engine, when c) the index value is equal to or larger than the first threshold value and d) the electronic control unit determines that the index value can be controlled to be smaller than the second threshold value through the pre-ignition suppression control, and iii) place the clutch in the released state and automatically start the internal combustion engine without performing the pre-ignition suppression control, when e) the index value is equal to or larger than the first threshold value and f) the electronic control unit determines that the index value cannot be controlled to be smaller than the second threshold value through the pre-ignition suppression control.

With the above arrangement, when the index value can be controlled to be smaller than the second threshold value through the pre-ignition suppression control, a delay in starting can be reduced while vibration of the vehicle in the starting direction is suppressed. Also, when the index value cannot be controlled to be lower than the second threshold value, the clutch is placed in the released state, and the internal combustion engine is automatically started, so that vibration of the vehicle in the starting direction can be suppressed. The second threshold value may be different from the first threshold value, or may be the same value as the first threshold value.

The electronic control unit may be configured to perform at least one of cylinder purge start control, rich injection control, injection retard control, intake stroke synchronized injection control, first compression-ratio reduction control, and second compression-ratio reduction control, as the pre-ignition suppression control. The cylinder purge start control is control under which a) a fuel is not supplied to a cylinder in which ignition can be performed at an earliest time and b) a fuel is supplied to a cylinder into which intake air is drawn after the request for automatic start is made. The rich injection control is control under which the fuel is injected such that an air-fuel ratio in a cylinder becomes rich to cool the cylinder. The injection retard control is control under which a fuel injection time is set to a retard side relative to a reference fuel injection time set based on engine operating conditions. The intake stroke synchronized injection control is control under which the fuel is injected in a period corresponding to a period of intake stroke. The first compression-ratio reduction control is control under which at least one of a valve timing and a valve lift amount is changed such that a compression ratio is reduced. The second compression-ratio reduction control is control under which the compression ratio is reduced by a variable compression-ratio mechanism.

According to (i) cylinder purge start control, the fuel is not supplied to the cylinder in which ignition can be performed at the earliest time, but supplied to the cylinder into which intake air is drawn after the request for automatic start is made. Therefore, high-temperature air or air-fuel mixture after automatic stop is discharged from the cylinder in which ignition is performed, and new air having a relatively low temperature is introduced into the cylinder, so that the temperature of the air-fuel mixture in the cylinder is less likely or unlikely to be increased. Accordingly, pre-ignition can be suppressed. According to (ii) rich injection control, the air or air-fuel mixture in the cylinder, or a wall of a combustion chamber, is cooled by latent heat of vaporization of the fuel. Accordingly, pre-ignition can be suppressed. According to (iii) injection retard control, the fuel injection time is set to the retard side relative to the reference fuel injection time, so that a length of time from fuel injection to ignition can be reduced, and pre-ignition can be suppressed. According to (iv) intake stroke synchronized injection control, as compared with the case where so-called "outside-intake-stroke injection" in which fuel is injected on an exhaust stroke, a homogeneous air-fuel mixture is formed in the intake port, and then the mixture is drawn into the cylinder, is carried out, the port wet amount, or the amount of injected fuel wetting the port, and the valve wet amount can be reduced, and the in-cylinder temperature can be lowered due to latent heat of vaporization of the fuel supplied into the cylinder. Therefore, the air-fuel mixture in the cylinder can be promptly made rich, and the in-cylinder temperature can also be reduced, so that pre-ignition can be suppressed. The intake stroke synchronized injection may be applied to a so-called port-injection-type internal combustion engine including a fuel injection valve in each intake port. According to (v) the first compression-ratio reduction control and the second compression-ratio reduction control, the actual compression ratio is reduced by increasing the amount of intake air that flows back into the intake port, so that pre-ignition can be suppressed. According to (ii) reduction of the compression ratio by the variable compression-ratio mechanism, pre-ignition can be suppressed by reducing the compression ratio.

The electronic control unit may be configured to place the clutch in the engaged state and automatically start the internal combustion engine when a) the request for automatic start is made, b) a vehicle speed is equal to zero, and c) a braking device is placed in an ON state under brake hold control for holding braking force after a brake pedal is placed in an OFF state.

With this arrangement, vibration of the vehicle in the starting direction can be suppressed since the braking device is ON. Also, since the internal combustion engine is automatically started with the clutch placed in the engaged state, a delay in starting can be reduced or prevented.

In at least one of (i) the case where an elapsed time from automatic stop to the request for automatic start is shorter than a predetermined time, (ii) the case where the request for automatic start is made, and a direction indicator is in an ON state, (iii) the case where the request for automatic start is made, and an accelerator operation amount is smaller than a value as a condition for automatic start, and (iv) the case where the request for automatic start is made, and a distance to an obstacle present in a travelling direction of the vehicle is smaller than a predetermined value, the electronic control unit may be configured to (a) 1) perform the pre-ignition suppression control and 2) place the clutch in the engaged state and automatically start the internal combustion engine, when the electronic control unit determines that the index value can be controlled to be smaller than the second threshold value through the pre-ignition suppression control, and (b) place the clutch in the released state, and automatically start the internal combustion engine, without performing the pre-ignition suppression control, when the electronic control unit determines that the index value cannot be controlled to be smaller than the second threshold value through the pre-ignition suppression control.

In the case (i) where the elapsed time from automatic stop to the request for automatic start is shorter than the predetermined short-time restart reference value, such as when the vehicle is temporarily stopped for change of its course when crossing an opposing lane, or when the vehicle position is adjusted in a parking lot, stress placed on the driver by vibration of the vehicle in the starting direction is relatively large, and it is therefore desirable to suppress the vibration. In the case (ii) where the direction indicator is ON, the vehicle is likely to be temporarily stopped or decelerated during or immediately before change of its course, and stress placed on the driver by vibration of the vehicle in the starting direction is relatively large; therefore, it is desirable to suppress the vibration. In the case (iii) where the request for automatic start is made, and the accelerator depression amount is smaller than a given value as a condition for automatic start, the internal combustion engine starts irrespective of the driver's intention, such as when the automatic start is caused by reduction of the state of charge of the battery, for example. In this case, stress placed on the driver by vibration of the vehicle in the starting direction is relatively large, and it is therefore desirable to suppress the vibration. (iv) When the distance to an obstacle present in the travelling direction is smaller than the predetermined value, stress placed on the driver by vibration of the vehicle in the starting direction is relatively large, and it is thus particularly desirable to suppress the vibration.

Accordingly, in the above cases, pre-ignition suppression control is performed, so that the stress placed on the driver due to vibration in the starting direction can be alleviated or reduced.

The vehicle may further include a transmission, and the clutch may be provided in a power transmission path between the internal combustion engine and the transmission. The vehicle may further include a hydraulic torque converter, and the clutch may be provided in the power transmission path between the internal combustion engine and the hydraulic torque converter.

In these cases, the internal combustion engine can be restarted with a reduced load, and vibration caused by restart can be further reduced.

The electronic control unit may be configured to place the clutch in the engaged state while the internal combustion engine is stopped after being automatically stopped.

Generally, the transition of the clutch from the engaged state to the released state is completed in a shorter required time, with quicker response, and is less likely to suffer from shock at the time of switching, as compared with the transition from the released state to the engaged state. Accordingly, as in the above arrangement, it is advantageous to place the clutch in the engaged state while the internal combustion engine is stopped after being automatically stopped.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 11 is a flowchart illustrating one example of a routine of automatic start control when this invention is applied to the vehicle including the manual transmission.

DETAILED DESCRIPTION OF EMBODIMENTS

Figure 1:
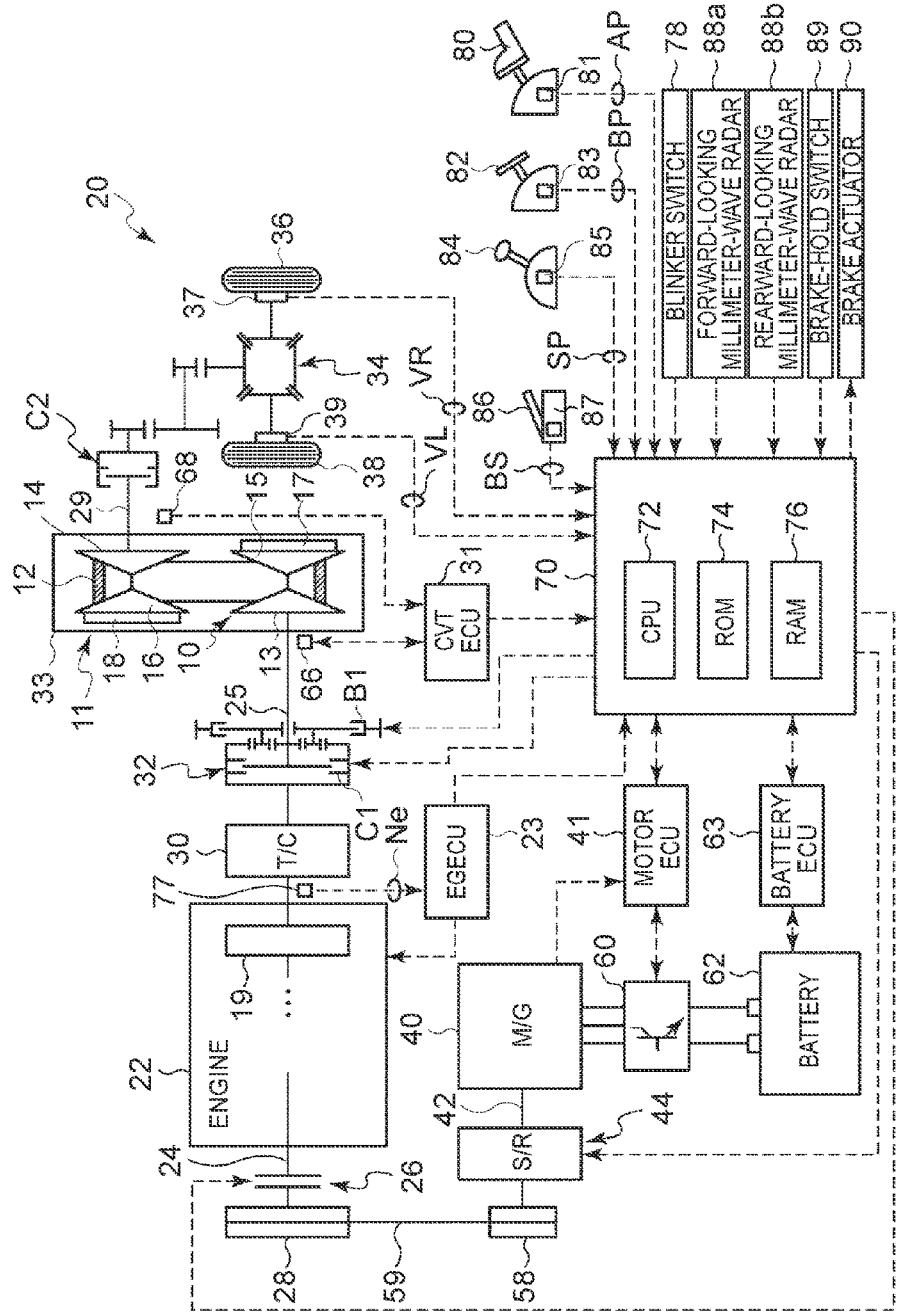
FIG. 1 a view showing the configuration of a control system for a vehicle according to a first embodiment of the invention.

Next, a first embodiment of the invention will be described with reference to the drawings. FIG. 1 shows the general configuration of a vehicle 20 according to the first embodiment of the invention. The vehicle 20 has an engine 22, a hydraulic torque converter 30, a forward/reverse switching mechanism 32, and a belt driven type continuously variable transmission (which will also be called "CVT") 33. The forward/reverse switching mechanism 32 has a function of permitting and inhibiting transmission of power from the engine 22, and changes the direction of output rotation of the engine 22. The vehicle 20 further has a motor-generator 40 that also operates as a generator capable of restarting the engine 22, a battery 62, and an electronic control unit 70 that controls the system as a whole. The battery 62 is operable to supply electric power to the motor-generator 40 via an inverter 60, and can be charged with electric power generated by the motor-generator 40. The power from the engine 22 is transmitted to the output shaft 29 via the CVT 33 that changes the speed of rotation, and then transmitted to drive wheels 36, 38, through a differential gear 34 connected to the output shaft 29 via an output-side clutch C2 and gears.

The engine 22 is a spark ignition internal combustion engine using gasoline as fuel. The engine 22 is of so-called in-cylinder direct injection type, and the fuel is directly injected into cylinders via fuel injection valves (not shown). The operation control of the engine 22 includes control of the opening of a throttle valve (not shown) and control of the valve-opening time of the fuel injection valves, which are performed by an electronic control unit for the engine (which will be called "EGECU").

The output-side clutch C2 is a mechanical friction clutch, but may be another type of clutch, such as an electromagnetic clutch.

The forward/reverse switching mechanism 32 includes a forward/reverse switching clutch (forward clutch) C1 and forward/reverse switching brake (reverse brake) B1, both of which are hydraulically operated. When the forward clutch C1 is engaged (ON), and the reverse brake B1 is released (OFF), an input shaft 25 of the CVT 33 is rotated in the positive direction with the power transmitted from the engine 22. In the following description, this condition will be called "an engaged state of the forward/reverse switching mechanism 32" when appropriate. When the forward clutch C1 is released (OFF), and the reverse brake B1 is engaged (ON), the input shaft 25 of the CVT 33 is rotated in the reverse direction with the power from the engine 22. When both of the forward clutch C1 and the reverse brake B1 are released (OFF), a neutral condition is established, and the power from the engine 22 is not transmitted to the input shaft 25 of the CVT 33. In the following description, this condition will be called "a released state of the forward/reverse switching mechanism 32". The forward/reverse switching mechanism 32 has the function of permitting and interrupting transmission of power from the engine 22 to the wheels 36, 38, and functions as the clutch according to an embodiment of the present invention.

The input shaft 25 and output shaft 29 of the CVT 33 are respectively provided with variable pulleys 10, 11 whose effective diameters are variable, and a transmission belt 12 is engaged with the variable pulleys 10 and 11 to extend therebetween. The variable pulleys 10, 11 include stationary rotating bodies 13, 14 fixed to the input shaft 25 and the output shaft 29, respectively, and movable rotating bodies 15, 16 provided on the input shaft 25 and the output shaft 29, respectively, such that these bodies 15, 16 can move in the axial direction and cannot rotate relative to the input and output shafts 25, 29. The movable rotating bodies 15, 16 are arranged to be moved in the axial direction when operated by hydraulic actuators 17, 18 mounted on these bodies 15, 16, respectively. With the movable rotating bodies 15, 16 thus moved, the widths of V grooves formed between the stationary rotating bodies 13, 14 and the movable rotating bodies 15, 16 are varied, so that the engaging diameter of the transmission belt 12 is changed.

The input shaft 25 and output shaft 29 of the CVT 33 are respectively provided with rotation sensors 66, 68 for detecting the rotational speeds of these shafts 25, 29. The rotation sensors 66, 68 are electrically connected to an electronic control unit for CVT (which will be called "CVTECU") 31, and the CVTECU 31 controls the speed ratio of the CVT 33 based on detection signals of the rotation sensors 66, 68. Also, the speed ratio of the CVT 33 is changed according to running conditions and the operating state or selected position of a shift lever 84 provided in the vehicle interior.

An oil pump 19 used for operating the CVT 33 and other hydraulic equipment is directly coupled to a crankshaft 24 of the engine 22. The output side of the oil pump 19 is connected to the hydraulic actuators 17, 18 of the CVT 33 via a hydraulic control circuit (not shown), and the forward/reverse switching mechanism 32, output-side clutch C2, and so forth.

The motor-generator 40, which is a synchronous motor generator, is used in place of a starter motor (not shown) when the engine 22 is restarted during execution of stop-and-start control (which will be called "S&S control") which will be described later. The motor-generator 40 is also used for regenerating electric power when the engine 22 is braked. A speed reducer 44 is mounted on a rotary shaft 42 as an output shaft of the motor-generator 40, and a pulley 58 is mounted to the speed reducer 44. The speed reducer 44 consists of a planetary gear train and a one-way clutch as main components, and is operable to reduce the speed of rotation of the rotary shaft 42, or transmit its rotation to the pulley 58 without reducing the speed. On the other hand, a pulley 28 is mounted to the crankshaft 24 of the engine 22 via a clutch 26, and a belt 59 is engaged with the pulley 28 and the pulley 58 to extend therebetween. With this arrangement, the engine 22 can be restarted by the motor-generator 40, and, to the contrary, the motor-generator 40 can be operated as a generator with the power of the engine 22.

The operation of the motor-generator 40 is controlled by an electronic control unit for the motor (which will be called "motor ECU") 41 via the inverter 60. The motor ECU 40 performs operation control of the motor-generator 40, by sequentially controlling the ratio of ON times of six transistors as switching devices included in the inverter 60 connected to the battery 62, so as to control current flowing through each coil of three-phase coils of the motor-generator 40. The motor ECU 41 also performs control for operating the motor-generator 40 as a generator. The battery 62 is in the form of a chargeable/dischargeable secondary battery, and the state of charge and charge/discharge of the battery 62 are controlled by an electronic control unit for the battery (which will be called "battery ECU") 63.

A brake actuator 90 has a function of optimally distributing hydraulic pressures to brake constituent elements (e.g., wheel cylinders of a hydraulic drum brake, or calipers of a hydraulic disk brake) provided on four or two wheels, so as to control a braking state. The brake actuator 90 includes electromagnetic valves (not shown). The electromagnetic valves are operated to shut off flow of brake oil (not shown) in pipes, so that the brake oil is held at a constant pressure in the wheels cylinders or hydraulic cylinders of the calipers, for example, and the braking force is held constant, namely, a brake-hold condition is established. Also, when the operation of the electromagnetic valves is stopped, the brake oil in the pipes ceases to be shut off, and the wheels cylinders or the hydraulic cylinders in the calipers are connected with an oil tank, so that the braking force is permitted to vary, namely, the brake-hold condition is terminated. The brake actuator 90 is used for brake-hold control which will be described later.

The electronic control unit 70 is configured as a one-chip microprocessor having CPU 72 at its center, and includes ROM 74 in which processing programs are stored, RAM 76 in which data is temporarily stored, communication ports (not shown) through which it communicates with the EGECU 23, CVTECU 31, motor ECU 41, and the battery ECU 63, and input and output ports (not shown).

The electronic control unit 70 receives, via input ports, drive wheel speeds VR, VL from vehicle speed sensors 37, 39 mounted on the drive wheels 36, 38, engine speed Ne from a crank angle sensor 77 provided in the vicinity of the crankshaft of the engine 22, accelerator pedal position AP as the amount of depression of the accelerator pedal 80 detected by an accelerator pedal position sensor 81, and a shift position SP as a signal indicative of each of the operation positions of the shift lever 84, namely, each position of P (Parking), D (Drive), R (Reverse), N (Neutral), 4, 3, 2, and L (Low), which is detected by a shift position sensor 85. The electronic control unit 70 also receives, via input ports, a pressure BP of depression of a foot brake pedal 82 detected by a brake pedal sensor 83, and signals from a blinker switch 78 provided at the driver's seat for operating a direction indicator, forward-looking millimeter-wave radar 88a and rearward-looking millimeter-wave radar 88b that detect a distance to an obstacle present in the travelling direction, and a brake-hold switch 89 provided on an instrument panel of the driver's seat for operation under brake hold control (which will be described later), in addition to a brake switch BS indicative of ON/OFF of a side brake lever 86 detected by a side brake position sensor 87.

Also, the electronic control unit 70 outputs various control signals via output ports. These control signals include a drive signal to the clutch 26, a drive signal to the speed reducer 44, drive signals to the forward clutch C1 and reverse brake B1 of the forward/reverse switching mechanism 32, and a drive signal to the brake actuator 90.

In the vehicle 20 constructed as described above, the electronic control unit 70 performs S&S control for automatically stopping and automatically restarting the engine 22 according to vehicle conditions. Conditions for automatic stop of the engine 22 are that "the vehicle is in a stopped state" AND "ACCELERATOR OFF" (the accelerator pedal 80 is not depressed), when the shift lever 84 is in the N position or P position. When the shift lever 84 is in the D position, the conditions for automatic stop of the engine 22 are that "the vehicle speed is lower than a predetermined value Vth (e.g., less than 6 km/h) AND "ACCELERATOR OFF" (the accelerator pedal 80 is not depressed to a predetermined ON angle Dstart) AND "BRAKE ON" (the brake pedal 82 is depressed at a pressure that is equal to or larger than a predetermined value Pth). The predetermined value Pth may be set to different values according to the rotational speed of the output shaft of the hydraulic torque converter 30. The conditions for automatic stop also include those that are not caused by driving or operating conditions created by the driver, other than the above-described ones caused by driving or operating conditions created by the driver. The conditions that are not caused by the driver's operating conditions include "the state of charge (SOC) of the battery 62 is equal to or greater than a predetermined value", "the CVT oil temperature is within a predetermined range", and "the engine water temperature is equal to or higher than a predetermined value". The stopped state of the vehicle is determined based on the vehicle speed V that is computed from the drive wheel speeds VR, VL detected by the vehicle speed sensors 37, 38. The depressed states of the accelerator pedal 80 and the brake pedal 82 are determined based on the accelerator pedal position AP detected by the accelerator pedal position sensor 81, and the brake pedal position BP detected by the brake pedal sensor 83. On the other hand, conditions for automatic restart of the engine 22 are satisfied when any of the above-described automatic stop conditions is not satisfied. For example, when the shift lever 84 is in the D position, conditions for automatic restart are "the vehicle speed is lower than a predetermined value (e.g., less than 6 km/h) AND "BRAKE OFF" (the brake pedal 82 is depressed at a pressure that is equal to or lower than the predetermined value Pth).

The engine 22 is automatically stopped by stopping fuel injection and stopping supply of electric power to ignition plugs, and the engine 22 is restarted by restarting fuel injection and supply of electric power to the ignition plugs, and driving the motor-generator 40. The S&S control is performed when the vehicle is decelerated after warm-up is completed, for example, for improvement of the fuel economy and reduction of emissions. During execution of the S&S control, if the engine 22 is automatically stopped under S&S control, an S&S control execution flag indicating that the S&S control is being executed is set, (the S&S control execution flag will be described later) in the following automatic start control. Further, in the first embodiment, the forward/reverse switching mechanism 32 is controlled to be held in the engaged state, while the engine 22 is stopped after it is automatically stopped under S&S control.

Also, in the vehicle 20, when the brake-hold switch 89 as described above is ON, the brake hold control is performed by the electronic control unit 70. The brake hold control is used when the driver waits for a traffic signal or is caught in a traffic jam. When the vehicle is stopped, the vehicle is kept in the stopped state under the brake hold control, without requiring the driver to depress the brake pedal. Then, the vehicle can start by only requiring the driver to depress the accelerator pedal. According to the brake hold control, a burden placed on the driver when the vehicle is frequently and repeatedly stopped and started is alleviated or reduced. When the braking force is held constant, the electronic control unit 70 determines, by use of the accelerator pedal position sensor 81, whether the accelerator pedal 80 is depressed. If the accelerator pedal 80 is depressed, the electronic control unit 70 terminates the braking force holding state.

An example of automatic start control performed in the vehicle 20 constructed as described above will be described.

Figure 3:
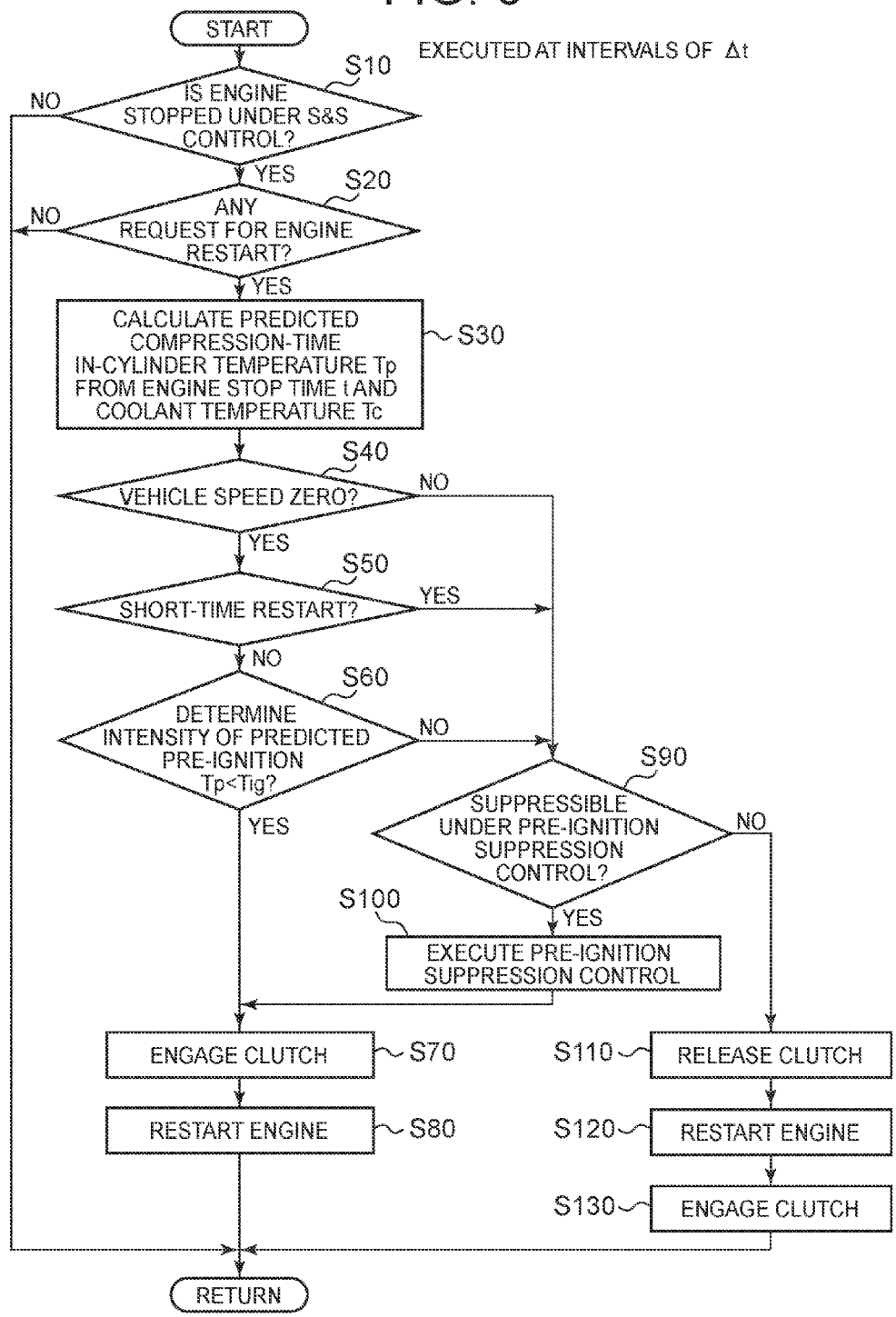
FIG. 3 is a flowchart illustrating one example of a routine of automatic start control executed in the first embodiment.

FIG. 3 is a flowchart illustrating one example of a routine of automatic start control executed by the CPU 72 of the electronic control unit 70 of the first embodiment. The routine of FIG. 3 is repeatedly executed at given time intervals from the time when an ignition key (not shown) is turned ON.

Once the control routine is executed, the electronic control unit 70 initially determines whether the engine 22 is in the automatically stopped state under the S&S control, based on whether the S&S control execution flag as described above is set (step S10). If the vehicle is running normally with the S&S control not being executed, a negative decision (NO) is obtained in step S10, and this routine ends. If the engine 22 is automatically stopped under the S&S control, an affirmative decision (YES) is obtained in step S10, and it is then determined whether a request for engine restart is made (step S20). If no request for restart is made, a negative decision (NO) is obtained in step S20, and this routine ends.

If a request for restart is made in step S20, for example, if the shift lever 84 is in the D position, and "the vehicle speed is lower than a predetermined value (e.g., lower than 6 km/h)", while "BRAKE OFF" (the brake pedal 82 is depressed at a pressure less than the predetermined value Pth), an index value having a positive correlation with the intensity of pre-ignition is estimated. The intensity of pre-ignition mentioned herein means the intensity of vibration (or acceleration) of the engine 22, or a peak value of the in-cylinder pressure, when pre-ignition takes place. In step S30, a predicted compression-time in-cylinder temperature Tp is estimated as the index value having a positive correlation with the intensity of pre-ignition. The predicted compression-time in-cylinder temperature Tp is a predicted in-cylinder temperature when the compression stroke and fuel injection are performed, and the possibility and intensity of pre-ignition are supposed to be greater as this value (temperature Tp) is higher. The predicted compression-time in-cylinder temperature Tp is calculated based on the stop time t of the engine 22, and is corrected based on the coolant temperature Tc. The computation for estimation is performed using an in-cylinder temperature map stored in the ROM 74 of the electronic control unit 70.

Figure 2:
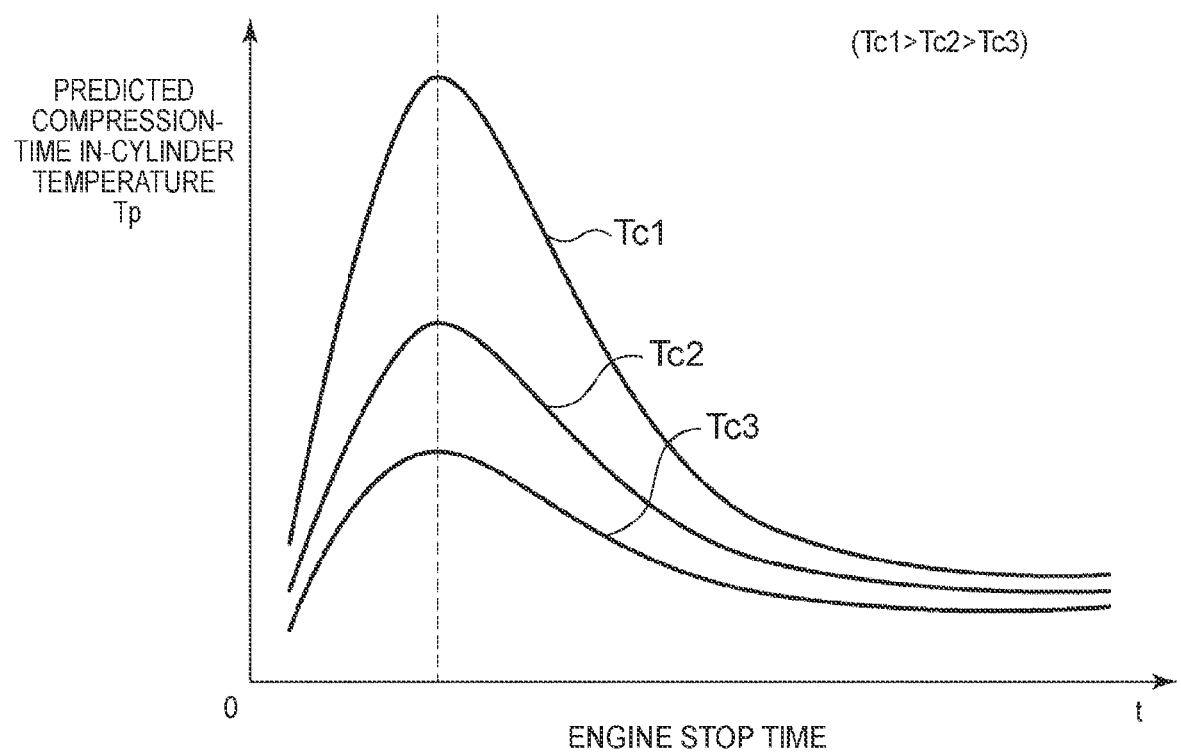
FIG. 2 is a graph showing an example of an in-cylinder temperature map.

As shown in FIG. 2, the in-cylinder temperature map is stored in which the stop time t of the engine 22 is associated with the predicted compression-time in-cylinder temperature Tp. Since the air is not taken out of the interior of each cylinder after the engine 22 is stopped, the in-cylinder temperature (namely, the temperature of air or air-fuel mixture in the cylinder) sharply rises due to heat received from a wall of a combustion chamber, and decreases as the temperature of the stopped engine 22 decreases, after the stop time t passes a certain peak time. For this reason, in the in-cylinder temperature map, the predicted compression-time in-cylinder temperature Tp is set so as to be likely to increase in a region in which the stop time t is relatively short, but likely to decrease after the stop time t passes the peak time indicated by the dotted line in FIG. 2. Also, as shown in FIG. 2, as the coolant temperature Tc is higher (Tc1>Tc2>Tc3), the air or air-fuel mixture in the cylinder receives a larger quantity of heat from the wall of the combustion chamber, and therefore, the predicted compression-time in-cylinder temperature Tp is corrected so as to be higher as the coolant temperature Tc increases.

Next, it is determined whether the vehicle speed is equal to zero, based on the detected values of the vehicle speed sensors 37, 39 (step S40). This determination may be made based on the rotational speed of the output shaft 29 of the CVT 33. When the vehicle speed is not equal to zero, the vehicle is to be restarted before it is stopped (which will be called "pre-stop restart"), and therefore, the control proceeds to step S90. When the vehicle is equal to zero, the vehicle is to be restarted after it is stopped (which will be called "post-stop restart" or "stopped S&S"), and therefore, the control proceeds to step S50.

In step S50, it is determined whether an elapsed time from automatic stop of the engine 22 to the request for restart is shorter than a predetermined short-time restart reference value. The short-time restart reference value used herein is preferably set to 2.5 seconds, for example. If an affirmative decision (YES) is obtained in step S50, namely, if the elapsed time from automatic stop to the request for restart is shorter than the short-time restart reference value, the control proceeds to step S90. If a negative decision (NO) is obtained in step S50, the control proceeds to step S60.

In step S60, the predicted compression-time in-cylinder temperature Tp previously estimated in step S30 is compared with a first threshold value. In this step, it is determined whether the predicted compression-time in-cylinder temperature Tp is lower than a predetermined pre-ignition threshold value Tig. If the predicted compression-time in-cylinder temperature Tp is lower than the pre-ignition threshold value Tig, pre-ignition is unlikely to occur, or the intensity of predicted pre-ignition is small enough to be virtually negligible. Accordingly, in this case, an affirmative decision (YES) is obtained in step S60, and the control proceeds to steps S70 and S80.

In step S70, the forward/reverse switching mechanism 32 is engaged. In the first embodiment, the forward/reverse switching mechanism 32 is controlled to be placed in the engaged state while the engine 22 is stopped after automatically stopped as described above; therefore, in step S70, the forward/reverse switching mechanism 32 is kept in the engaged state.

Then, a predetermined starting operation is performed on the engine 22 (step S80), and the routine of FIG. 3 returns. In the starting operation, a cylinder in which ignition can be performed in the first place is detected, based on a detected value of the crank angle sensor 77. Namely, a cylinder that will reach the compression stroke at the earliest point in time from a request for starting ignition and can undergo initial explosion at the time of ignition is identified from the cylinders of the engine. The electronic control unit 70 outputs an ignition signal to a corresponding ignition coil provided in this cylinder, and generates a command for ignition to the cylinder in question. As a result, the air-fuel mixture is ignited in the cylinder, and explosively burns. Namely, the initial explosion takes place in the cylinder. Then, the electronic control unit 70 generates commands for ignition to the remaining cylinders, according to a predetermined combustion order peculiar to the engine 22. In this manner, the engine 22 is started.

In the case of the pre-stop restart where the vehicle is not equal to zero in step S40, and the case of short-time restart, namely, when it is determined in step S50 that the elapsed time from automatic stop to the request for restart is shorter than the short-time restart reference value, the control proceeds to step S90. In step S90, it is determined whether the possibility and intensity of the predicted pre-ignition can be suppressed or reduced to permissible levels, under given pre-ignition suppression control. The pre-ignition suppression control mentioned herein is control for suppressing or reducing the intensity of pre-ignition, and may be selected from control methods as follows, for example. (1) Cylinder purge start: the ignition is not performed in the cylinder in which ignition can be performed at the earliest time, but performed in another cylinder. According to the cylinder purge start, no fuel is supplied to the cylinder in which ignition can be performed at the earliest time, but is supplied to a cylinder into which air is drawn after automatic start is requested; therefore, high-temperature air or air-fuel mixture after automatic stop is discharged from and new air is introduced into the cylinder in which ignition is to be performed, and increase of the temperature of the air-fuel mixture in the cylinder is curbed. Accordingly, pre-ignition can be suppressed. (2) Rich injection: fuel is injected so that the air-fuel ratio in the cylinder becomes richer than that in the case where the pre-ignition suppression control is not performed. According to the rich injection, air or air-fuel mixture in the cylinder, or the wall of the combustion chamber, is cooled by latent heat of vaporization of the fuel. Accordingly, pre-ignition can be suppressed. (3) Reduction of the compression ratio by change of the valve timing and/or the valve lift amount. According to this method, the actual compression ratio is reduced by increasing the amount of intake air that flows from the interior of the cylinder back to the intake port, so that pre-ignition can be suppressed.

As the pre-ignition suppression control, other methods for reducing the temperature of the air-fuel mixture in the cylinder, and/or reducing the compression ratio (or compression-time in-cylinder pressure) may be used. The pre-ignition suppression control may use a single method, or a desired combination of two or more methods.

The determination in step S90 is made by comparing the predicted compression-time in-cylinder temperature Tp as the index value with a predetermined suppressible threshold value Ts as a second threshold value. When the predicted compression-time in-cylinder temperature Tp is lower than the suppressible threshold value Ts, an affirmative decision (YES) is obtained in step S90, namely, it is determined that pre-ignition can be suppressed.

Figure 4:
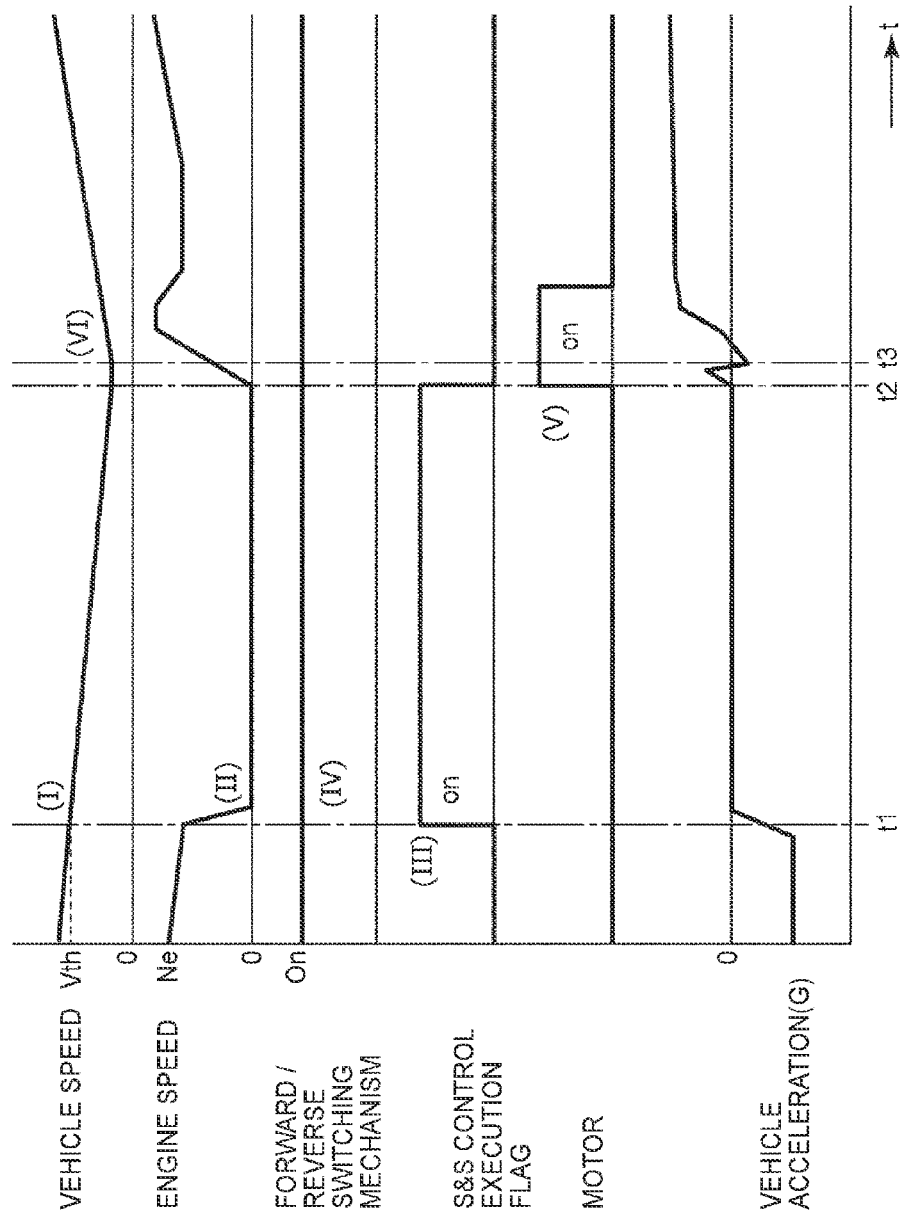
FIG. 4 is a timing chart showing conditions of respective parts when occurrence of pre-ignition is not predicted in the first embodiment.

In the case of pre-stop restart where the vehicle speed is not zero in FIG. 4, and the case where it is determined in step S50 that the elapsed time from automatic stop to the request for restart is shorter than the short-time restart reference value, pre-ignition is relatively highly likely to take place. Furthermore, since stress placed on the driver by vibration of the vehicle in the starting direction is highly likely to be relatively large, such as when the vehicle is temporarily stopped for change of the course for crossing an opposing lane, or when the vehicle position is adjusted in a parking lot, it is desirable to suppress the vibration. Accordingly, in these cases, the pre-ignition suppression control is performed even when the intensity of predicted pre-ignition is relatively small.

If it is determined in step S90 that the possibility and intensity of the predicted pre-ignition are at such levels that can be suppressed by given pre-ignition suppression control, the pre-ignition suppression control is performed (step S100). Then, the forward/reverse switching mechanism 32 is placed in the engaged state (step S70), and the engine 22 is automatically started (step S80).

On the other hand, when it is determined in step S90 that the possibility and intensity of the predicted pre-ignition are at such levels that cannot be suppressed even through the given pre-ignition suppression control, the pre-ignition suppression control is not performed. In this case, the forward/reverse switching mechanism 32 is placed in the released state (step S110), and the engine 22 is automatically started (step S120). Accordingly, even if pre-ignition occurs, vibration of the vehicle in the starting direction is suppressed. After the engine is automatically started in the above manner, the forward/reverse switching mechanism 32 starts being engaged (step S130), under a condition that the rotational speed Ne of the engine 22 exceeds a predetermined start-up determination rotational speed (e.g., 500 rpm).

In this specification, the process from step S60 through step S130 as described above will be called "predicted response control". In this process, when a request for automatic start is made, the clutch (forward/reverse switching mechanism 32) disposed in the power transmission path is placed in the released state, and the engine 22 is automatically started, if the index value having a positive correlation with the intensity of the predicted pre-ignition is equal to or larger than the first threshold value. If the index value is smaller than the first threshold value, the clutch is placed in the engaged state, and the engine 22 is automatically started.

Figure 5:
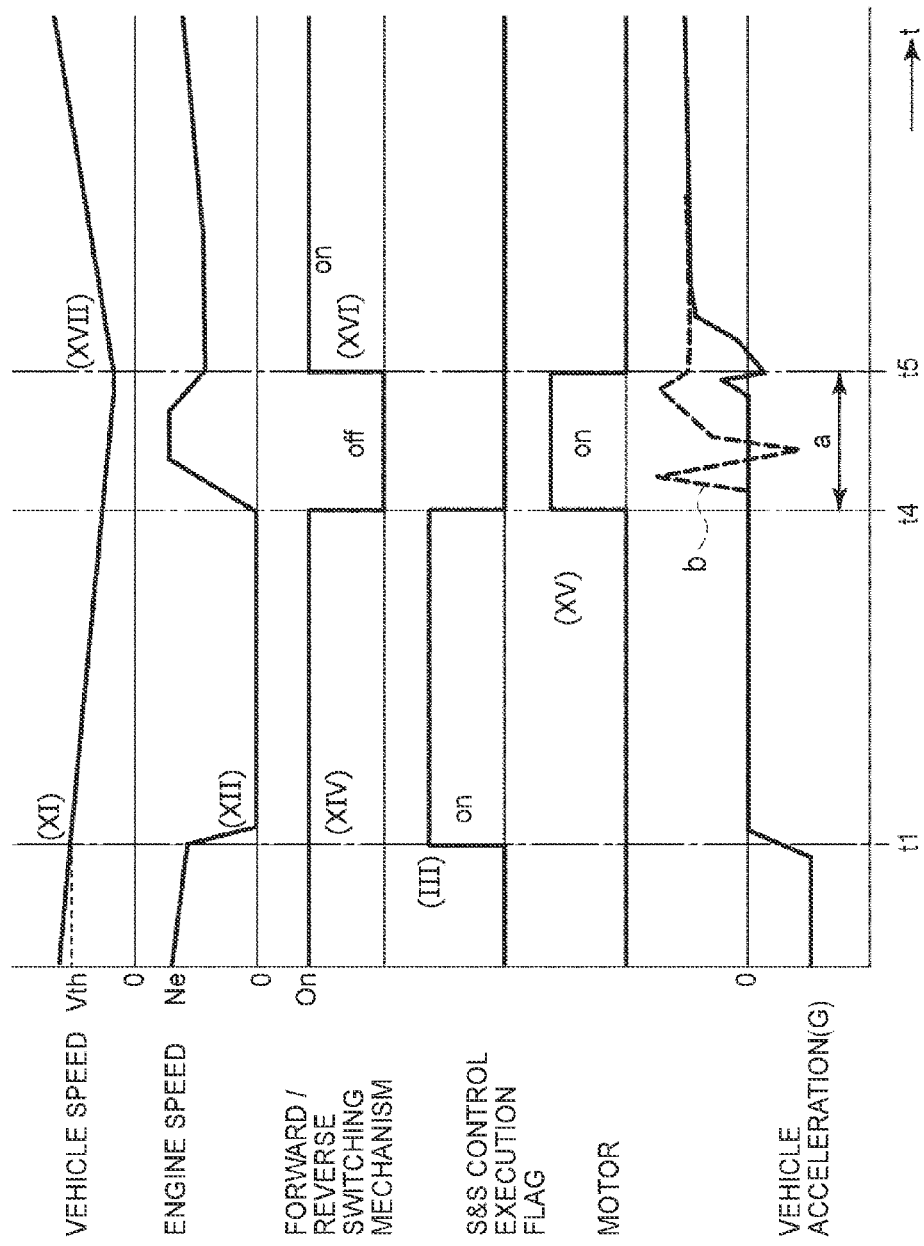
FIG. 5 is a timing chart showing conditions of respective parts when pre-ignition actually occurs in the first embodiment.

As a result of the above-described process, conditions of respective parts of the first embodiment change with time as indicated in FIG. 4 and FIG. 5. FIG. 4 is a timing chart showing conditions of respective parts in the case of so-called speed-reduction S&S, namely, where the engine 22 is automatically stopped while the vehicle is not stopped, and occurrence of pre-ignition is not predicted. In FIG. 4, at time t1, the vehicle speed becomes lower than a predetermined value Vth as a condition for engine automatic stop (I). Then, the engine 22 is automatically stopped (II), under a condition that other conditions of automatic stop are satisfied, and the S&S control execution flag is set to ON (III). While the engine 22 is stopped after it is automatically stopped, the forward/reverse switching mechanism 32 is engaged (IV). At time t2, if restart conditions are satisfied while the vehicle is not stopped, a request for restart is made (step S20), and the predicted compression-time in-cylinder temperature Tp is lower than the pre-ignition threshold value Tig (step S60), the motor-generator 40 is started (V) while the forward/reverse switching mechanism 32 is engaged (step S70), and the engine 22 is restarted (step S80). Although vibration is produced in the vehicle during a short period (t2-t3) at the time of restart of the engine 22, the vibration is not significant since no pre-ignition occurs. Since the engine 22 is restarted while the forward/reverse switching mechanism 32 is engaged, the vehicle speed increases without delay (VI). In the case where occurrence of pre-ignition is predicted, but the pre-ignition can be suppressed through pre-ignition suppression control, conditions of respective parts change with time in the same manner as in FIG. 4.

FIG. 5 is a timing chart showing conditions of respective parts in the case of speed-reduction S&S, namely, where the engine 22 is automatically stopped while the vehicle is not stopped, but occurrence of pre-ignition is predicted, it is determined that the pre-ignition cannot be suppressed through pre-ignition suppression control, and the pre-ignition actually takes place. In FIG. 5, the actions from (XI) to (XIV) are substantially identical with the actions from (I) to (IV) in FIG. 4. At time t4, if restart conditions are satisfied while the vehicle is not stopped, a request for restart is made (step S20), and the predicted compression-time in-cylinder temperature Tp is at such a level that it is determined that pre-ignition cannot be suppressed through pre-ignition suppression control (step S90), the motor-generator 40 is started (XV) while the forward/reverse switching mechanism 32 is placed in the released state (step S110), and the engine 22 is restarted (step S120). Then, the forward/reverse switching mechanism 32 is engaged at time t5 (XVI), and the vehicle speed starts increasing (XVII). In this case, a delay time "a" appears which corresponds to a period (t4-t5) from the time when the request for restart is made to the time when the vehicle speed starts increasing. However, vibration of the vehicle in the starting direction is suppressed, since the forward/reverse switching mechanism 32 is in the released state at the time of pre-ignition caused by restart of the engine 22. In FIG. 5, "b" represents vibration of the vehicle in the travelling direction in the case where it is assumed that the engine 22 is restarted while the forward/reverse switching mechanism 32 is engaged. Thus, the vibration of the vehicle in the travelling direction is significantly suppressed or reduced by releasing the forward/reverse switching mechanism 32 (S110).

As described above in detail, in the first embodiment, when a request for automatic start is made (step S20), the predicted response control is performed. Namely, when the predicted compression-time in-cylinder temperature Tp having a positive correlation with the intensity of the predicted pre-ignition is equal to or higher than the pre-ignition threshold value Tig (a negative decision (NO) is obtained in step S60), the forward/reverse switching mechanism 32 is placed in the released state, and the engine 22 is automatically started (steps S110, S120). When the predicted compression-time in-cylinder temperature Tp is lower than the pre-ignition threshold value Tig, the forward/reverse switching mechanism 32 is placed in the engaged state, and the engine 22 is automatically started (steps S70, S80). Accordingly, when the predicted compression-time in-cylinder temperature Tp is equal to or higher than the pre-ignition threshold value Tig (when a negative decision (NO) is obtained in step S60), the forward/reverse switching mechanism 32 is placed in the released state, and the engine 22 is automatically started (steps S110, S120), so that vibration of the vehicle in the starting direction upon occurrence of pre-ignition can be suppressed. On the other hand, when the predicted compression-time in-cylinder temperature Tp is lower than the pre-ignition threshold value Tig (an affirmative decision (YES) is obtained in step S60), the forward/reverse switching mechanism 32 is placed in the engaged state, and the engine 22 is automatically started (steps S70, S80), so that a delay in starting due to a time lag for transition of the forward/reverse switching mechanism 32 from the released state to the engaged state can be reduced.

Also, when it is predicted that the predicted compression-time in-cylinder temperature Tp cannot be reduced to be lower than the second threshold value even if the pre-ignition suppression control is performed, the forward/reverse switching mechanism 32 is placed in the released state, and the engine 22 is automatically started (steps S110, S120), so that vibration of the vehicle in the starting direction can be suppressed. The second threshold value (i.e., suppressible threshold value Ts) may be different from or the same as the first threshold value (i.e., pre-ignition threshold value Tig). If the second threshold value is set to a lower value than the first threshold value, the intensity of pre-ignition can be more effectively suppressed through execution of the pre-ignition suppression control. If the second threshold value is set to a higher value than the first threshold value, the suppression effect is weakened when the pre-ignition suppression control is performed, but some disadvantages (for example, a delay in starting in the case of cylinder purge start, or increase of fuel consumption in the case of rich injection) resulting from execution of the pre-ignition suppression control may be curbed or avoided. The second threshold value may be a fixed value, or a variable value. In view of change of the intensity of pre-ignition due to aging, for example, the second threshold value may be set so as to change according to an index, such as the travelling distance, which indicates the aging.

In the first embodiment, the temperature in the cylinder of the engine 22 is used as the index value having a positive correlation with the intensity of the predicted pre-ignition, and the in-cylinder temperature is estimated based on the elapsed time after the engine 22 is stopped; therefore, the intended effect of the invention can be achieved with a simple arrangement.

Also, in the first embodiment, the in-cylinder temperature is corrected based on the coolant temperature Tc of the engine 22, so that the prediction accuracy can be improved. The in-cylinder temperature, or other index values having a positive correlation with the intensity of the predicted pre-ignition, may be corrected based on at least one of the coolant temperature Tc and the properties of the fuel, or may be corrected based on other parameters, such as the intake air temperature. When the index value is corrected based on the properties of the fuel, detection signals of property sensors that detect the light transmissibility, relative permittivity and optical refraction index of the fuel, for example, and a knock sensor (not shown), may be used. For example, the index value may be corrected to be reduced as the octane level of the fuel is higher. Also, the pre-ignition threshold value Tig (first threshold value) may be corrected, in place of or in addition to correction of the coolant temperature.

Also, in the first embodiment, in the case where a request for automatic start is made (an affirmative decision (YES) is obtained in step S20), and the engine is restarted before the vehicle is stopped while the vehicle speed is not equal to zero (a negative decision (NO) is obtained in step S40), the case where the elapsed time from automatic stop to the request for restart is shorter than the short-time restart reference value (an affirmative decision (YES) is obtained in step S50), and the case where the predicted compression-time in-cylinder temperature Tp is equal to or higher than the pre-ignition threshold value Tig (a negative decision (NO) is obtained in step S60), the given pre-ignition suppression control is performed as long as it can be performed (steps S90, S100). Accordingly, the intensity of pre-ignition can be suppressed by the pre-ignition suppression control, so that vibration of the vehicle in the starting direction can be suppressed, and a delay in starting of the vehicle, which would occur when the engine 22 is restarted with the forward/reverse switching mechanism 32 being released, is more likely to be avoided.

Also, in the first embodiment, the electronic control unit 70 controls the forward/reverse switching mechanism 32 to place it in the engaged sate during automatic stop of the engine 22, and selectively maintains the engaged state or makes a transition from the engaged state to the released state when restarting the engine 22 (steps S20, S90, S150). Generally, the transition of the clutch from the engaged state to the released state is completed in a shorter required time, with quicker response, and is less likely to suffer from shock at the time of switching, as compared with transition from the released state to the engaged state. Accordingly, as in this embodiment, it is more advantageous to place the forward/reverse switching mechanism 32 in the engaged state while the engine 22 is stopped after being automatically stopped, rather than placing the forward/reverse switching mechanism 32 in the released state while the engine 22 is stopped.

Also, in the first embodiment, the forward/reverse switching mechanism 32 provided between the engine 22 and the transmission (CVT 33) in the power transmission path is placed in the released state when the engine 22 is automatically started, so that the inertial force (inertia) is reduced when pre-ignition occurs, and vibration transmitted from the engine 22 can be suppressed.

Next, a second embodiment of the invention will be described. In the second embodiment illustrated in FIG. 6, conditions for executing the predicted response control (steps S60-S130) in the first embodiment as described above are changed. The mechanical arrangement of the second embodiment is substantially identical with that of the first embodiment, and therefore will not be described in detail.

Figure 6:
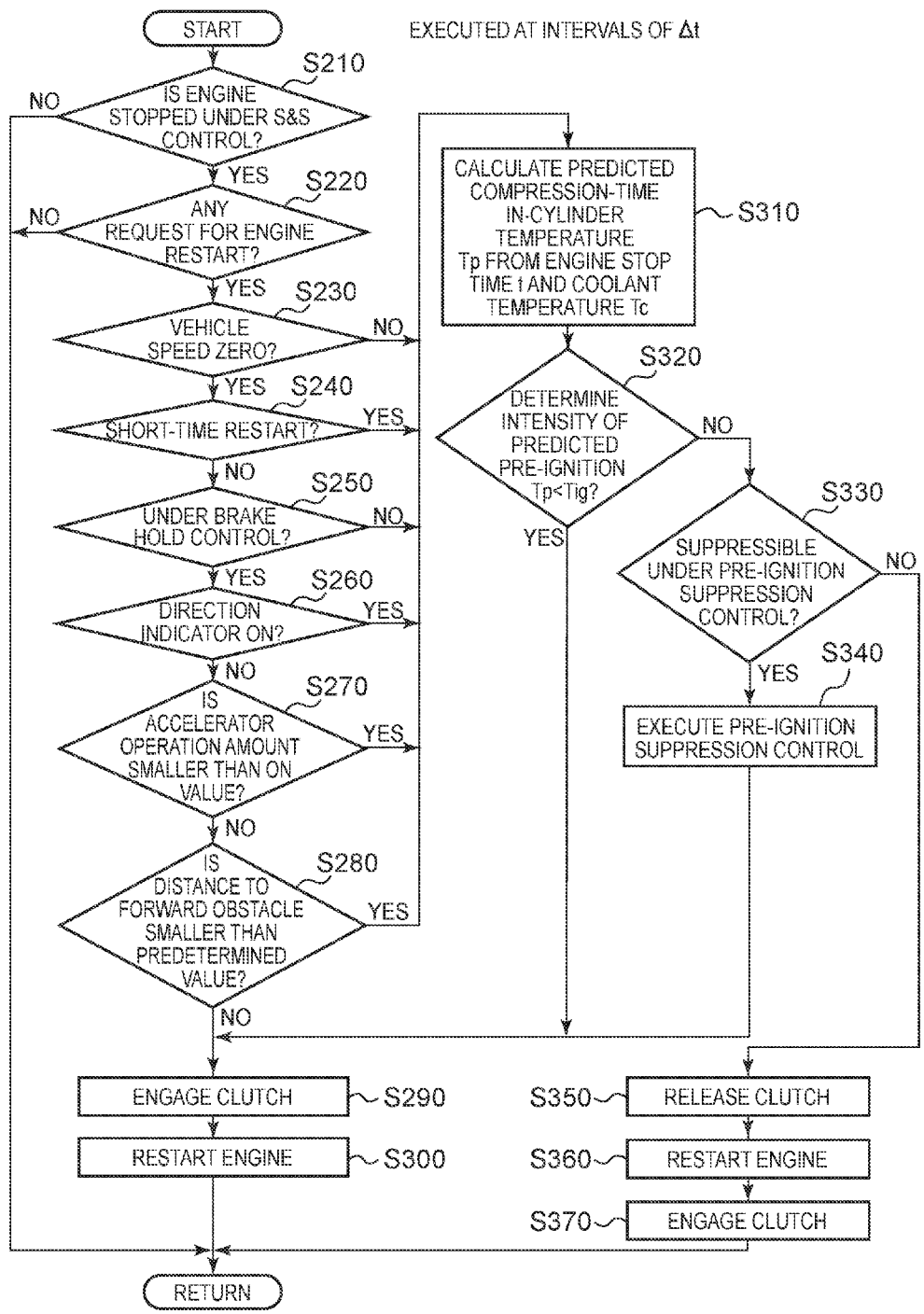
FIG. 6 is a flowchart illustrating one example of a routine of automatic start control executed in a second embodiment of the invention.

Referring to FIG. 6, an example of automatic start control performed in the second embodiment will be described. Initially, the electronic control unit 70 determines whether the engine (22) is in an automatically stopped state through execution of S&S control (step S210). Then, it is determined whether a request for engine restart is made (step S220). The contents of these steps are substantially identical with those of steps S10, S20 of the above-described first embodiment.

Then, it is determined whether the vehicle speed is equal to zero (step S230), and it is then determined whether the engine 22 is restarted in a short time (step S240). The contents of these steps are substantially identical with those of steps S40, S50 of the above-described first embodiment.

If a negative decision (NO) is obtained in step S240, namely, if the engine 22 is not restarted in a short time, it is then determined whether braking force is held constant under brake hold control (step S250). When the braking force is held constant under brake hold control, vibration of the vehicle in the starting direction is suppressed by the brake actuator 90 and can be permitted even if pre-ignition takes place. Accordingly, in this case, an affirmative decision (YES) is obtained in step S250, and the control proceeds to step S260.

In step S260, it is determined whether the direction indicator, or blinker switch 78, is ON. When the blinker switch 78 is ON, such as when the vehicle is temporarily stopped in the course of turning right or left, stress placed on the driver by vibration of the vehicle in the starting direction is relatively large; therefore, it is desirable to suppress the vibration. However, when the blinker switch 78 is not ON, vibration of the vehicle in the starting direction is suppressed by the brake actuator 90 and can be thus permitted even if pre-ignition takes place. Accordingly, in this case, a negative decision (NO) is obtained in step S260, and the control proceeds to step S270.

In step S270, it is determined whether the accelerator depression amount is smaller than an ON value Dstart as a condition for automatic start. When restart of the engine is requested even though the accelerator depression amount is smaller than the ON value Dstart, the engine 22 is started irrespective of the driver's intention, as in the case where the engine is automatically started due to reduction of the state of charge of the battery 62; therefore, stress placed on the driver by vibration of the vehicle in the starting direction is relatively large, and it is desirable to suppress the vibration. However, when the accelerator depression amount is equal to or larger than the ON value Dstart, the engine 22 is started according to the driver's intention, and no stress is caused by the start. Furthermore, even if pre-ignition occurs, vibration of the vehicle in the starting direction is suppressed by the brake actuator 90, and can be thus permitted. Accordingly, in this case, a negative decision (NO) is obtained in step S270, and the control proceeds to step S280.

In step S280, it is determined whether the distance to an obstacle present in the travelling direction is smaller than a predetermined value. The distance to the obstacle present in the travelling direction is detected by the forward-looking millimeter-wave radar 88a and the rearward-looking millimeter-wave radar 88b. When the distance to the obstacle present in the travelling direction is smaller than the predetermined value, stress placed on the driver by vibration of the vehicle in the starting direction is relatively large, and it is therefore desirable to suppress the vibration. However, when the distance to the obstacle present in the travelling direction is not smaller than the predetermined value, vibration of the vehicle in the starting direction is suppressed by the brake actuator 90 and can be thus permitted even if pre-ignition takes place. Accordingly, in this case, an affirmative decision (YES) is obtained in step S280, and the control proceeds to step S290.

In step S290, the forward/reverse switching mechanism 32 is controlled so as to be held in the engaged state, and a given starting operation is performed on the engine 22 in this condition (step S300). Then, the control returns. The operations of these steps S290, S300 are substantially identical with those of steps S70, S80 in the above-described first embodiment.

On the other hand, if a negative decision (NO) is obtained in step S230 or step S250, or an affirmative decision (YES) is obtained in step S240, S260, S270, or S280, predicted response control (steps S310-S370) is executed. The operations performed in the predicted response control are substantially identical with those of steps S30, S60 through S130 in the above-described first embodiment.

In the second embodiment as described above, in addition to the same effects as those of the first embodiment, when the braking force is held constant under the brake hold control, the forward/reverse switching mechanism 32 is placed in the engaged state, irrespective of the intensity of the predicted pre-ignition (step S290), and the engine 22 is automatically started (step S300). Accordingly, a delay in starting, which would occur when the engine 22 is restarted with the forward/reverse switching mechanism 32 being released, is more likely to be avoided.

In the second embodiment, even when the braking force is held constant under the brake hold control (an affirmative decision (YES) is obtained in step S250), the predicted response control (steps S310-S370) is executed in the case where the direction indicator is ON (step S260), the case where the accelerator depression amount is smaller than the ON value Dstart as an automatic start condition (step S270), and the case where the distance to an obstacle present in the travelling direction is smaller than the predetermined value (step S280). Accordingly, in these cases where stress placed on the driver by vibration of the vehicle in the starting direction is relative large, pre-ignition is more likely to be avoided.

By releasing any of other clutches provided in the power transmission path from the engine 22 to the drive wheels 36, 38, for the same purpose, in place of the forward/reverse switching mechanism 32, power transmission from the engine 22 to the drive wheels 36, 38 may be interrupted. The clutch released for this purpose may be, for example, the output-side clutch C2. Also, a clutch may be newly provided in the power transmission path between the engine 22 and the hydraulic torque converter 30, and this clutch may be released when the engine 22 is restarted. With this arrangement, when the engine 22 is restarted, the hydraulic torque converter 30 as well as the CVT 33 is disconnected from the engine 22, so that the engine 22 can be restarted with a reduced load, and vibration caused by the restart can be further reduced by reduction of the inertial force (inertia).

In each of the illustrated embodiments, the forward/reverse switching mechanism 32 is released upon restart of the engine 22 so as to suppress vibration of the vehicle in the travelling direction caused by pre-ignition. However, this arrangement may be replaced by an arrangement in which a driving member and a driven member of the forward/reverse switching mechanism 32, or a clutch used in place of the mechanism 32, slide against each other without transmitting power therebetween. In this case, too, substantially the same effect can be obtained. Furthermore, the time it takes from restart of the engine 22 to engagement of the clutch can be reduced, and therefore, the vehicle can be promptly started. The degree of engagement of the forward/reverse switching mechanism 32 or the clutch used in place of the mechanism 32 may be continuously or discretely changed, according to the intensity of the predicted pre-ignition. For example, the degree of engagement of the forward/reverse switching mechanism 32 or the clutch used in place of the mechanism 32 may be reduced as the intensity of the predicted pre-ignition is greater.

A part of or all of the determinations made in steps S240-S280 in the second embodiment may be omitted. The operations of steps S250-S280 in the second embodiment may be applied or employed when an affirmative decision (YES) is obtained in step S50 in the first embodiment, and the control may proceed to step S90 when a negative decision (NO) is obtained in step S250, or an affirmative decision (YES) is obtained in any of steps S260-S280. Any of the operations of steps S250-S280 in the second embodiment may be utilized for selecting one of two or more control patterns for the clutch (i.e., forward/reverse switching mechanism 32) and the engine under predicted response control, according to the result of the determination. The two or more control patterns include a pattern in which the clutch is engaged and the engine 22 is started irrespective of the value of the predicted compression-time in-cylinder temperature Tp, a pattern in which the clutch is engaged and the engine 22 is started only when the temperature Tp is lower than the threshold value Tip, a pattern in which the pre-ignition suppression control is performed, and the engine 22 is started with the clutch being engaged, and a pattern in which the pre-ignition suppression control is not performed, and the engine 22 is started with the clutch being released.

As the index value having a positive correlation with the intensity of the predicted pre-ignition, the predicted compression-time in-cylinder pressure, namely, the pressure in the cylinder at the time of predicted compression, may be used. The predicted compression-time in-cylinder pressure may be obtained from a given map or function, based on the valve timing, intake air amount, and the intake air temperature, for example.

The content of the pre-ignition suppression control is not limited to those of the above-described embodiments. In the case of a port-injection type internal combustion engine in which fuel is injected into an intake port, intake-stroke synchronized injection may be used as the pre-ignition suppression control. In the intake-stroke synchronized injection, the fuel is injected from a fuel injection valve, in a period corresponding to a period of intake stroke starting upon opening of an intake valve. According to the intake-stroke synchronized injection, advantageous effects as follows are provided, as compared with the case where so-called "outside-intake-stroke injection" is performed in which fuel is injected during an exhaust stroke, and a homogeneous air-fuel mixture is injected into the cylinder after it is formed in the intake port. As the advantageous effects, the port wet amount, or the amount of injected fuel wetting the port, and the valve wet amount can be reduced, and the in-cylinder temperature can be reduced due to latent heat of vaporization of the fuel supplied into the cylinder. Therefore, the air-fuel mixture in the cylinder can be promptly made rich, and the temperature in the cylinder can be reduced, so that pre-ignition can be suppressed.

In the case of an internal combustion engine having a variable compression ratio mechanism, reduction of the compression ratio by the variable compression ratio mechanism can be applied or employed as pre-ignition suppression control. As the variable compression ratio mechanism, various mechanisms, such as a mechanism for moving a cylinder block relative to a crank case, and a mechanical for changing the length of a connecting rod by a multi-link mechanism, have been proposed. According to this method, pre-ignition can be suppressed by reduction of the compression ratio.

A control variable or variables of the pre-ignition suppression control may be continuously or discretely changed, according to the index value (e.g., predicted compression-time in-cylinder temperature Tp) having a positive correlation with the intensity of the predicted pre-ignition. For example, the fuel injection amount in rich injection and a delay or retard amount in injection retardation may be increased as the predicted compression-time in-cylinder temperature Tp is higher. The type and combination of pre-ignition suppression control(s) to be executed may be changed according to the intensity of the predicted pre-ignition (e.g., the predicted compression-time in-cylinder temperature Tp).

Figure 7:
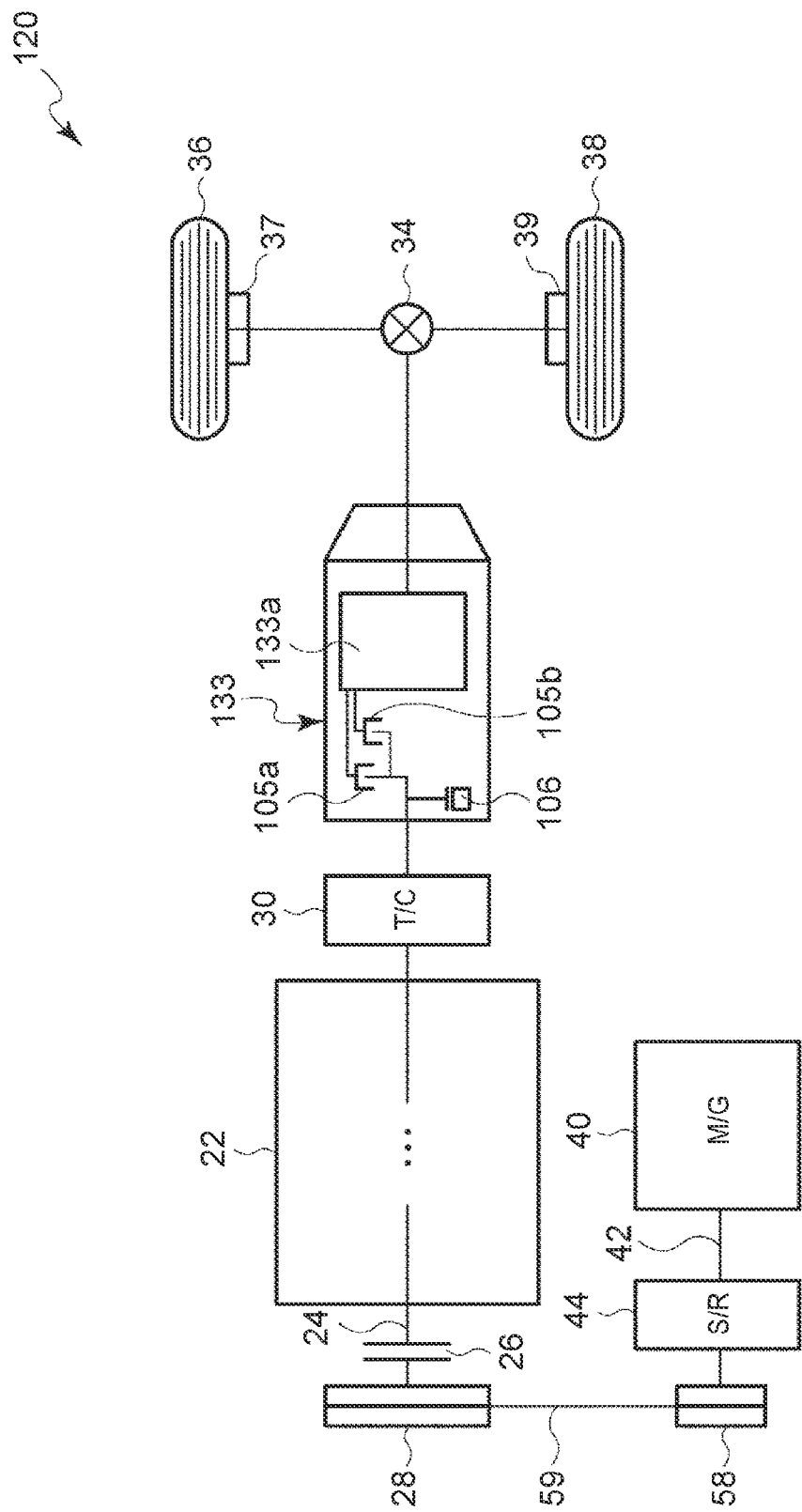
FIG. 7 is a view showing the configuration of a vehicle including an automatic transmission having two or more gear positions, to which this invention can be applied.

Embodiments of the present invention may be applied to vehicles having power transmission paths having other arrangements. For example, FIG. 7 shows a vehicle 120 including an automatic transmission 133 having two or more gear positions. The automatic transmission 133 includes a planetary gear unit 133a that is placed in a selected one of two or more forward-drive gear positions and one reverse-drive gear position with selected ones of clutches and brakes operated in combination. The change gear ratio of the automatic transmission 133 is automatically selected according to running conditions, and is also selected according to the operating state of a shift lever (not shown). A forward clutch 105a that is engaged for forward running, and a reverse clutch 105b that is engaged for reverse running are provided inside the automatic transmission 133. For the remaining mechanical arrangement in the modified example shown in FIG. 7, the same reference numerals as used in FIG. 1 are assigned to the same or corresponding members as those of the first embodiment, and these members will not be described. In the vehicle 120, the operation performed on the forward/reverse switching mechanism 32 in the above-described embodiment is applied to the forward clutch 105a, so that the control routine of FIG. 3 in the above embodiment can be applied as it is.

Figure 8:
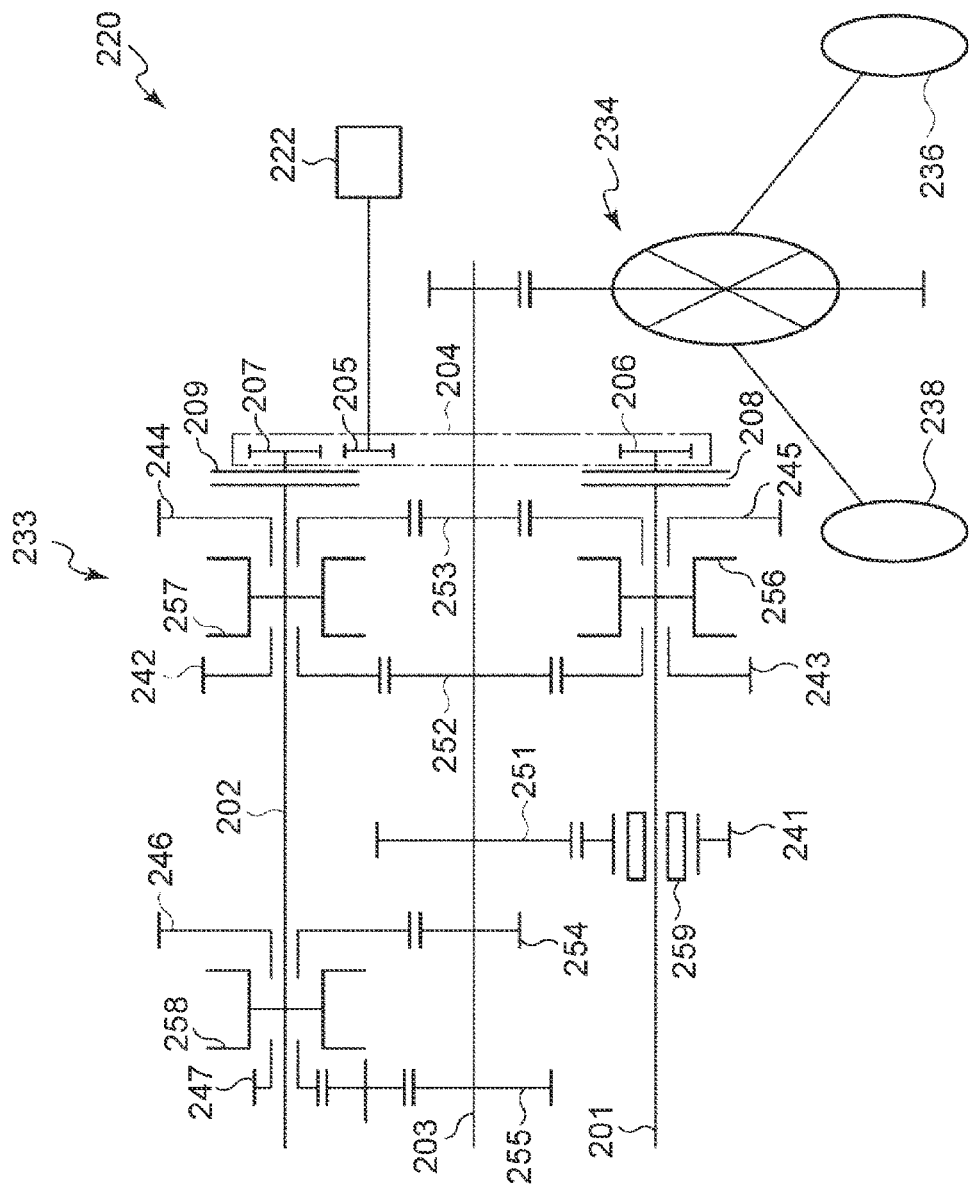
FIG. 8 is a view showing the configuration of a vehicle including a dual clutch transmission, to which this invention can be applied.

Embodiments of the present invention may also be applied to a vehicle 220 having a dual clutch transmission 233 as shown in FIG. 8. In FIG. 8, the dual clutch transmission 233 has a first input shaft 201, a second input shaft 202, and an output shaft 203. The drive power is transmitted from the engine 222 via a chain 204 and sprockets 205, 206, 207, to be received by the first input shaft 201 via a first clutch 208, and received by the second input shaft 202 via a second clutch 209. The first clutch 208 and second clutch 209 may permit transmission of power from the engine 222 when they are in the engaged state, and interrupt the power transmission when they are in the released state.

A first drive gear 241, a third drive gear 243 and a fifth drive gear 245 are rotatably mounted on the first input shaft 201. A second drive gear 242, a fourth drive gear 244, a sixth drive gear 246, and a reverse drive gear 247 are rotatably mounted on the second input shaft 202. Driven gears 251, 252 253, 254, 255 are fixed to the output shaft 203. In the dual clutch transmission 233, the first clutch 208, second clutch 209, and dog clutches 256, 257, 258 are operated by hydraulic actuators (not shown), so that the output of the engine 222 is generated with its speed changed, to be transmitted to the drive wheels 236, 238 via a differential gear 234. The hydraulic actuators are controlled by an electronic control unit (not shown).

In the vehicle 220 of FIG. 8, the operation performed on the forward/reverse switching mechanism 32 in the above-described embodiment is performed on the first clutch 208 and the second clutch 209, so that the control routine of FIG. 3 in the above embodiment can be applied as it is.

Figure 9:
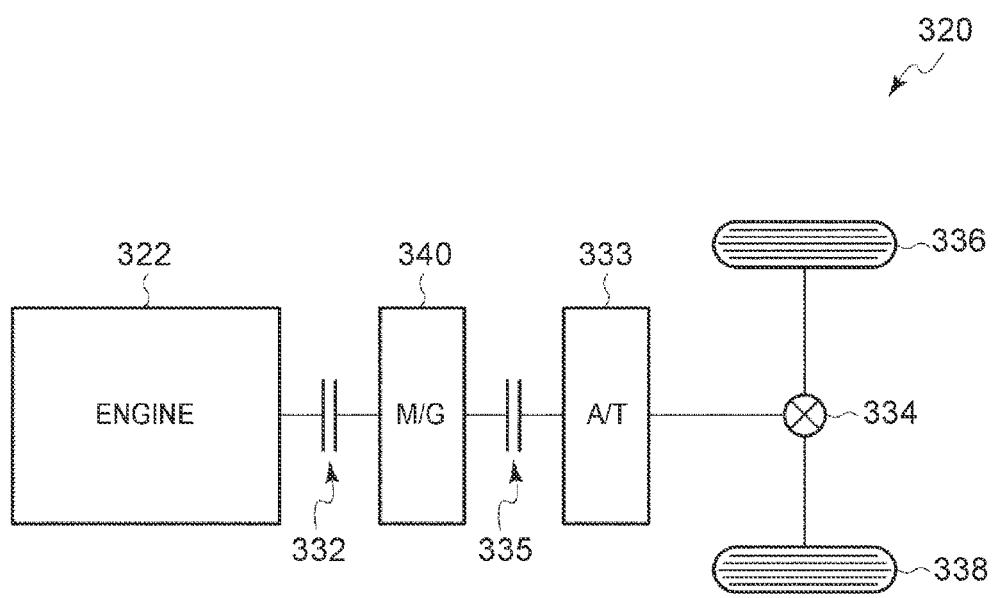
FIG. 9 is a view showing the configuration of a hybrid vehicle to which this invention can be applied.

Embodiments of the present invention may also be applied to a hybrid vehicle 320 as shown in FIG. 9. In FIG. 9, the vehicle 320 has an engine 322, a motor-generator 340 and an automatic transmission 333. A first clutch 332 is provided between the engine 322 and the motor-generator 340, and a second clutch 335 is provided between the motor-generator 340 and the automatic transmission 333. The first clutch 332 and the second clutch 335 permit transmission of power from the engine 322 when they are in the engaged states, and interrupt the power transmission when they are in the released state. An output shaft of the automatic transmission 333 is connected to a differential gear 334 and drive wheels 336, 338.

The hybrid vehicle 320 runs only with power from the motor-generator 340 when it starts from a stopped state and runs at a low load, and runs only with power from the engine 322 when it runs at a constant speed, while the vehicle 320 runs with power from both the engine 322 and the motor-generator 340 when it runs at a high load. Also, during braking and deceleration, the engine 322 is stopped, and electric power is regenerated by the motor-generator 340. In the vehicle 320, the first clutch 332 and the second clutch 335 are operated by hydraulic actuators (not shown), so that the output of the engine 322 is generated with its speed changed, to be transmitted to the drive wheels 336, 338 via the differential gear 334. The engine 322, motor-generator 340 and the hydraulic actuators are controlled by an electronic control unit (not shown).

In the vehicle 320 of FIG. 9, the operation performed on the forward/reverse switching mechanism 32 in the above-described embodiment may be performed on at least one of the first clutch 332 and the second clutch 335, so that the control routine of FIG. 3 in the above embodiment may be applied as it is. As a rule, the hybrid vehicle 320 runs only with power from the motor-generator 340 when it starts from the stopped state. Therefore, the situation where vibration of the vehicle in the starting direction arises from pre-ignition when the engine 322 is restarted is limited. However, when a sudden starting operation is performed, such as when the accelerator pedal is largely depressed, or when the engine 322 starts irrespective of the driver's intention (such as when the engine 322 is automatically started due to reduction of the state of charge of a battery for driving the motor-generator 340), a request for restart of the engine 322 may be made at the time of starting of the vehicle, and the control routine of FIG. 3 may be favorably applied.

Figure 10:
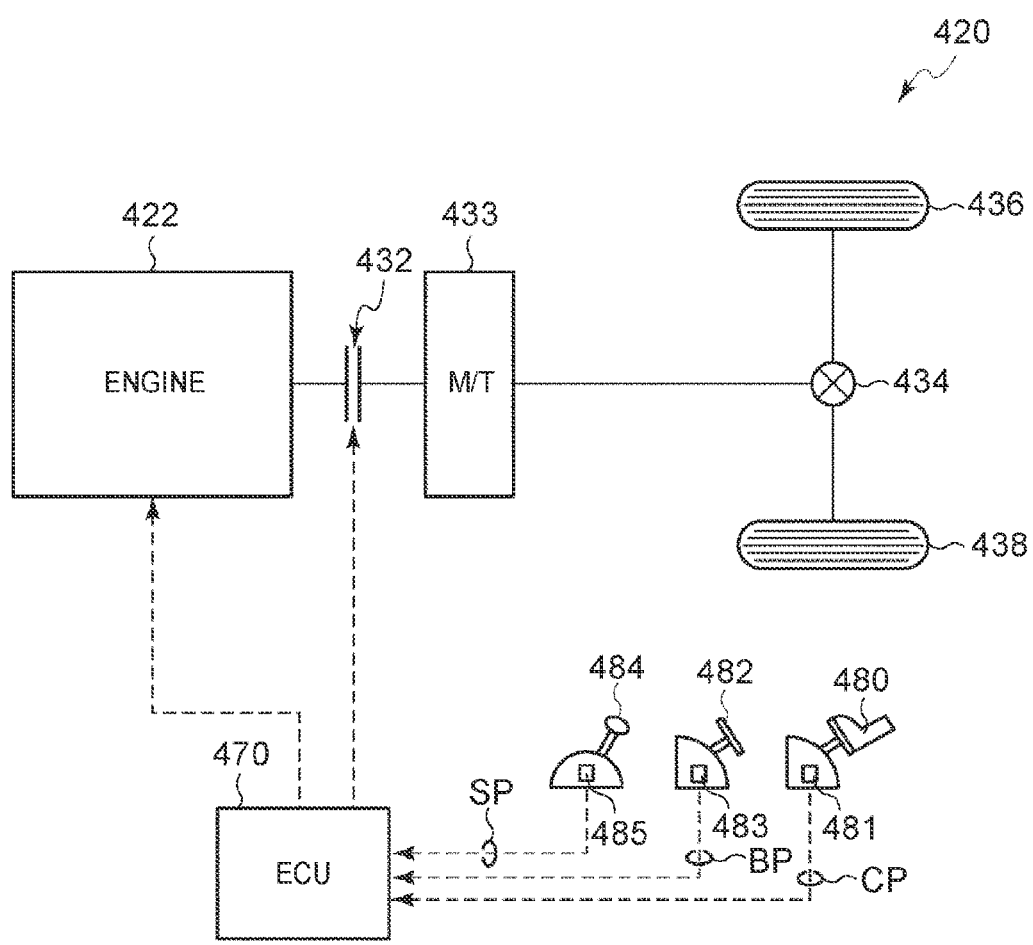
FIG. 10 is a view showing the configuration of a vehicle including a manual transmission, to which this invention can be applied.

Embodiments of the present invention may be applied to a vehicle 420 including a manual transmission 433 as shown in FIG. 10. In FIG. 10, the vehicle 420 has an engine 422 and the manual transmission 433, and a clutch 432 is provided between the engine 422 and the manual transmission 433. The clutch 432 is able to permit transmission of power from the engine 422 when it is in the engaged state, and interrupt the power transmission when it is in the released state. An output shaft of the manual transmission 433 is connected to a differential gear 434 and drive wheels 436, 438. The clutch 432 is a so-called clutch by wire type, and the degree of engagement of the clutch 432 can be electrically controlled based on the driver's operation performed on a clutch pedal 480. An electronic control unit 470 receives, via input ports, a clutch pedal position CP as an amount of depression of the clutch pedal 480 detected by a clutch pedal position sensor 481, a shift position SP as a signal indicative of the operation position of a shift lever 484 detected by a shift position sensor 485, namely, each position of R (reverse), N (neutral), "4", "3", "2", and "1", and a depression pressure BP of a foot brake pedal 482 detected by a brake pedal sensor 483.

In this case, the automatic start control is performed according to a control routine of FIG. 11, for example. The electronic control unit 470 initially determines whether the engine 422 is in an automatically stopped state through execution of S&S control (step S410). Then, it is determined whether a request for engine restart is made (step S420). Then, in step S430, the predicted compression-time in-cylinder temperature Tp is estimated, as an index value having a positive correlation with the intensity of pre-ignition. The contents of these steps are substantially the same as those of steps S10-S30 in the first embodiment as described above.

Then, it is determined whether the operation position of the shift lever 484 is the "N" position (step S440), and it is then determined whether the clutch pedal 480 is in the OFF position (step S450). If an affirmative decision (YES) is obtained in step S450, namely, when the transmission 433 is in the neutral position, and the clutch pedal 480 is in the OFF position (the clutch 432 is intended to be engaged), the control proceeds to step S460. If a negative decision (NO) is obtained in step S440 or step S450, namely, when the transmission 433 is not in the neutral position, and the clutch pedal 480 is in the ON position (the clutch 432 is intended to be released), the control proceeds to step S490. The contents of steps S460 through S530 are substantially identical with those of steps S60 through S130 in the above-described first embodiment.

In this example, when a request for automatic start is made (step S420), the predicted response control as follows is performed. When the predicted compression-time in-cylinder temperature Tp having a positive correlation with the intensity of the predicted pre-ignition is equal to or higher than the pre-ignition threshold value Tig (NO is obtained in step S460), the engine 422 is automatically started with the clutch 432 placed in the released state (steps S510, S520). If the predicted compression-time in-cylinder temperature Tp is lower than the pre-ignition threshold value Tig, the engine 422 is automatically started with the clutch 432 placed in the engaged state (steps S470, S480). Accordingly, when the predicted compression-time in-cylinder temperature Tp is equal to or higher than the pre-ignition threshold value Tig (NO is obtained in step S460), the clutch 432 is placed in the released state and the engine 422 is automatically started (steps S510, S520), even when the clutch pedal is in the OFF position (S450), so that vibration of the vehicle in the starting direction upon occurrence of pre-ignition can be suppressed. On the other hand, when the predicted compression-time in-cylinder temperature Tp is lower than the pre-ignition threshold value Tig (YES is obtained in step S460), the clutch 432 is placed in the engaged state, and the engine 422 is automatically started (steps S470, S480), so that a delay in starting due to a time lag for transition of the clutch 432 from the released state to the engaged state can be reduced.

This invention is not limited to the above-described embodiments and modified examples, but all modified examples, examples of applications, and equivalents encompassed by the concept of the invention defined by the appended claims are included in the invention. Accordingly, the invention is not to be construed in a limited way, but may be applied to any other technology that is within the range of the concept of the invention.

What is claimed is:

1. A control system for a vehicle, the vehicle including an internal combustion engine configured to perform automatic stop and automatic start, and a clutch configured to permit transmission of power from the internal combustion engine to wheels when the clutch is in an engaged state, the clutch being configured to interrupt transmission of power from the internal combustion engine to the wheels when the clutch is in a released state, the control system comprising:
at least one electronic control unit configured to
  i) place the clutch in the released state and automatically start the internal combustion engine in response to a request for automatic start and an index value is equal to or larger than a first threshold value, the index value having a positive correlation with an intensity of predicted pre-ignition, and
  ii) place the clutch in the engaged state and automatically start the internal combustion engine, in response to a request for automatic start and the index value is smaller than the first threshold value.

2. The control system according to claim 1, wherein the index value is a temperature in a cylinder of the internal combustion engine.

3. The control system according to claim 2, wherein the electronic control unit is configured to estimate the temperature in the cylinder based on an elapsed time from stopping of the internal combustion engine.

4. The control system according to claim 1, wherein the electronic control unit is configured to correct at least one of the index value and the first threshold value based on at least one of a coolant temperature of the internal combustion engine and properties of a fuel.

5. The control system according to claim 1, wherein the electronic control unit is configured to place the clutch in the engaged state and automatically start the internal combustion engine in response to a) the request for automatic start is made, b) a vehicle speed is equal to zero and c) a braking device is placed in an ON state under brake hold control for holding braking force after a brake pedal is placed in an OFF state.

6. The control system according to claim 1, wherein the vehicle further includes a transmission, and
the clutch is provided in a power transmission path between the internal combustion engine and the transmission.

7. The control system according to claim 1, wherein the vehicle further includes a hydraulic torque converter, and
the clutch is provided in a power transmission path between the internal combustion engine and the hydraulic torque converter.

8. The control system according to claim 1, wherein the electronic control unit is configured to place the clutch in the engaged state while the internal combustion engine is stopped after being automatically stopped.

9. A control system for a vehicle, the vehicle including an internal combustion engine configured to perform automatic stop and automatic start, and a clutch configured to permit transmission of power from the internal combustion engine to wheels when the clutch is in an engaged state, the clutch being configured to interrupt transmission of power from the internal combustion engine to the wheels when the clutch is in a released state, the control system comprising:
at least one electronic control unit configured to
  i) place the clutch in the engaged state and automatically start the internal combustion engine, in response to a request for automatic start and an index value is smaller than the first threshold value, the index value having a positive correlation with an intensity of predicted pre-ignition, ii) determine whether the index value can be made smaller than a second threshold value, through pre-ignition suppression control for suppressing the pre-ignition, iii) a) perform the pre-ignition suppression control and b) place the clutch in the engaged state and automatically start the internal combustion engine, in response to c) the index value being equal to or larger than the first threshold value and d) the electronic control unit determines that the index value can be made smaller than the second threshold value through the pre-ignition suppression control, and iv) place the clutch in the released state and automatically start the internal combustion engine without performing the pre-ignition suppression control, in response to e) the index value is equal to or larger than the first threshold value and f) the electronic control unit determines that the index value cannot be made smaller than the second threshold value through the pre-ignition suppression control.

10. The control system according to claim 9, wherein the electronic control unit is configured to perform at least one of cylinder purge start control, rich injection control, injection retard control, intake stroke synchronized injection control, first compression-ratio reduction control, and second compression-ratio reduction control, as the pre-ignition suppression control, the cylinder purge start control being control under which a) a fuel is not supplied to a cylinder in which ignition can be performed at an earliest time and b) a fuel is supplied to a cylinder into which intake air is drawn after the request for automatic start is made, the rich injection control being control under which the fuel is injected such that an air-fuel ratio in a cylinder becomes rich to cool the cylinder, the injection retard control being control under which a fuel injection time is set to a retard side relative to a reference fuel injection time set based on engine operating conditions, the intake stroke synchronized injection control being control under which the fuel is injected in a period corresponding to a period of intake stroke, the first compression-ratio reduction control being control under which at least one of a valve timing and a valve lift amount is changed such that a compression ratio is reduced, and the second compression-ratio reduction control being control under which the compression ratio is reduced by a variable compression-ratio mechanism.

11. The control system according to claim 9, wherein in at least one of (i) a case where an elapsed time from automatic stop to the request for automatic start is shorter than a predetermined time, (ii) a case where the request for automatic start is made, and a direction indicator is in an ON state, (iii) a case where the request for automatic start is made, and an accelerator operation amount is smaller than a value as a condition for automatic start, and (iv) a case where the request for automatic start is made, and a distance to an obstacle present in a travelling direction of the vehicle is smaller than a predetermined value, the electronic control unit is configured to a) 1) perform the pre-ignition suppression control and 2) place the clutch in the engaged state and automatically start the internal combustion engine, after the electronic control unit determines that the index value can be made smaller than the second threshold value through the pre-ignition suppression control, and b) place the clutch in the released state and automatically start the internal combustion engine without performing the pre-ignition suppression control, after the electronic control unit determines that the index value cannot be made smaller than the second threshold value through the pre-ignition suppression control.

* * * * *